US009195305B2

(12) United States Patent
Markovic et al.

(10) Patent No.: US 9,195,305 B2
(45) Date of Patent: *Nov. 24, 2015

(54) RECOGNIZING USER INTENT IN MOTION CAPTURE SYSTEM

(71) Applicant: Microsoft Corporation, Redmond, WA (US)

(72) Inventors: Relja Markovic, Seattle, WA (US);
Stephen G Latta, Seattle, WA (US);
Kevin A Geisner, Mercer Island, WA (US); Jonathan T Steed, Redmond, WA (US); Darren A Bennett, Seattle, WA (US); Amos D Vance, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

This patent is subject to a terminal disclaimer.

(21) Appl. No.: 13/671,875

(22) Filed: Nov. 8, 2012

(65) Prior Publication Data

US 2013/0074002 A1 Mar. 21, 2013

Related U.S. Application Data

(63) Continuation of application No. 12/688,808, filed on Jan. 15, 2010, now Pat. No. 8,334,842.

(51) Int. Cl.
*G09G 5/00* (2006.01)
*G06F 3/01* (2006.01)

(52) U.S. Cl.
CPC .............. *G06F 3/011* (2013.01); *G06F 3/017* (2013.01)

(58) Field of Classification Search
CPC .................... G06F 3/011; G06F 3/017
USPC ......................................... 715/781
See application file for complete search history.

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 101254344 B 6/2010
EP 0583061 A2 2/1994
(Continued)

OTHER PUBLICATIONS

Non-final Office Action dated Sep. 19, 2013, U.S. Appl. No. 12/778,790, filed May 12, 2010.
(Continued)

*Primary Examiner* — Scott Baderman
*Assistant Examiner* — Hassan Mrabi
(74) *Attorney, Agent, or Firm* — Gregg Wisdom; Judy Yee; Micky Minhas

(57) ABSTRACT

Techniques for facilitating interaction with an application in a motion capture system allow a person to easily begin interacting without manual setup. A depth camera system tracks a person in physical space and determines a probabilistic measure of the person's intent to engage of disengage with the application based on location, stance and movement. Absolute location in a field of view of the depth camera, and location relative to another person, can be evaluated. Stance can include facing a depth camera, indicating a willingness to interact. Movements can include moving toward or away from a central area in the physical space, walking through the field of view, and movements which occur while standing generally in one location, such as moving one's arms around, gesturing, or shifting weight from one foot to another.

20 Claims, 19 Drawing Sheets

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,993,314 A | 11/1999 | Dannenberg |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,046 B1 | 7/2001 | Waters et al. |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,428,449 B1 | 8/2002 | Apseloff |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,365,737 B2 | 4/2008 | Marvit et al. |
| 7,367,887 B2 | 5/2008 | Watabe et al. |
| 7,372,977 B2 | 5/2008 | Fujimura et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |

(56) References Cited

U.S. PATENT DOCUMENTS

| | | | |
|---|---|---|---|
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 7,961,174 | B1 | 6/2011 | Markovic et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,079,938 | B2 | 12/2011 | Jones et al. |
| 2003/0109310 | A1 | 6/2003 | Heaton |
| 2004/0155962 | A1 | 8/2004 | Marks |
| 2007/0021199 | A1 | 1/2007 | Ahdoot |
| 2007/0192910 | A1 | 8/2007 | Vu et al. |
| 2007/0198128 | A1 | 8/2007 | Ziegler et al. |
| 2007/0199108 | A1 | 8/2007 | Angle et al. |
| 2008/0026838 | A1 | 1/2008 | Dunstan et al. |
| 2008/0040692 | A1 | 2/2008 | Sunday et al. |
| 2008/0152191 | A1 | 6/2008 | Fujimura et al. |
| 2008/0242421 | A1 | 10/2008 | Geisner |
| 2009/0058850 | A1 | 3/2009 | Fun |
| 2009/0077501 | A1 | 3/2009 | Partridge et al. |
| 2009/0079813 | A1 | 3/2009 | Hildreth |
| 2009/0141933 | A1 | 6/2009 | Wagg |
| 2009/0163262 | A1 | 6/2009 | Kang |
| 2009/0220124 | A1 | 9/2009 | Siegel |
| 2009/0221368 | A1 | 9/2009 | Yen et al. |
| 2009/0233770 | A1 | 9/2009 | Vincent et al. |
| 2009/0249227 | A1 | 10/2009 | Clark |
| 2009/0267894 | A1 | 10/2009 | Doi et al. |
| 2009/0315740 | A1 | 12/2009 | Hildreth et al. |
| 2009/0322763 | A1 | 12/2009 | Bang et al. |
| 2010/0093435 | A1 | 4/2010 | Glaser et al. |
| 2010/0238182 | A1 | 9/2010 | Geisner et al. |
| 2010/0259493 | A1 | 10/2010 | Chang et al. |
| 2010/0259546 | A1 | 10/2010 | Yomdin et al. |
| 2010/0302142 | A1 | 12/2010 | French et al. |
| 2010/0306261 | A1 | 12/2010 | Geisner et al. |
| 2011/0053676 | A1 | 3/2011 | Wolf et al. |
| 2011/0141052 | A1 | 6/2011 | Bernstein et al. |
| 2011/0175809 | A1 | 7/2011 | Markovic et al. |
| 2011/0175810 | A1 | 7/2011 | Markovic et al. |
| 2011/0185316 | A1 | 7/2011 | Reid et al. |
| 2011/0210926 | A1 | 9/2011 | Pasquero et al. |
| 2011/0219340 | A1 | 9/2011 | Pathangay et al. |
| 2011/0279368 | A1 | 11/2011 | Klein et al. |
| 2011/0292181 | A1* | 12/2011 | Acharya et al. ............... 348/47 |
| 2013/0190089 | A1* | 7/2013 | Wilson et al. ............... 463/36 |

FOREIGN PATENT DOCUMENTS

| | | |
|---|---|---|
| JP | 08044490 A1 | 2/1996 |
| JP | 2008-225985 A | 9/2008 |
| WO | 93/10708 A1 | 6/1993 |
| WO | 97/17598 A1 | 5/1997 |
| WO | 99/44698 A1 | 9/1999 |
| WO | WO 2009/035705 A1 | 3/2009 |
| WO | WO2009/042579 A1 | 4/2009 |
| WO | WO2009/059065 | 5/2009 |
| WO | WO2011/087890 A3 | 7/2011 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

(56) References Cited

OTHER PUBLICATIONS

Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
English Machine-translation of Japanese Publication No. JP08-044490 published on Feb. 16, 1996.
Response to Office Action dated Dec. 17, 2013, U.S. Appl. No. 12/778,790, filed May 12, 2010.
Response to Office Action dated Dec. 24, 2013, Chinese Patent Application No. 201110128898.7.
English translation of the Amended Claims for 2nd OA (Marked-up & Clean Copies) filed in Response to Office Action dated Dec. 24, 2013, Chinese Patent Application No. 201110128898.7.
Response to Examiner Telephone Interview dated Dec. 31, 2013, Chinese Patent Application No. 201110024963.1.
English translation of Amended Claims as Proposed by Examiner filed in response to Examiner Telephone Interview dated Dec. 31, 2013, Chinese Application No. 201110024963.1.
European Office Action dated Dec. 13, 2012, European Application No. 10843613.0.
Response to Office Action dated Jan. 8, 2013, U.S. Appl. No. 12/778,790, filed May 12, 2010.
Chinese Office Action dated Jan. 18, 2013, Chinese Application No. 201110024963.1.
Final Office Action dated Feb. 21, 2014, U.S. Appl. No. 12/778,790, filed May 12, 2010.
Final Office Action dated Mar. 20, 2013, U.S. Appl. No. 12/778,790, filed May 12, 2010.
Response to Office Action dated Mar. 25, 2013, European Patent Application No. 10843613.0.
Chinese Office Action dated Mar. 29, 2013, Chinese Patent Application No. 201110128898.7.
Chinese Office Action dated Jun. 3, 2013, Chinese Patent Application No. 201110024963.1.
Response to Office Action dated Jun. 6, 2013, Chinese Patent Application No. 201110024963.1.
English translation of the Summary of the Response to 2nd OA and Amended Claims for Resp to 2nd OA dated Jun. 6, 2013, Chinese Patent Application No. 201110024963.1.
Response to Office Action dated Jun. 28, 2013, Chinese Patent Application No. 201110128898.7.
English translation of the Summary of the Arguments and Amended Claims for 1st OA dated Jun. 28, 2013, Chinese Patent Application No. 201110128898.7.
European Search Report dated Nov. 29, 2012, European Application No. 10843613.0.
Office Action dated Oct. 8, 2013, Chinese Patent Application No. 201110024963.1.
Response to Office Action dated Oct. 11, 2013, Chinese Patent Application No. 201110024963.1.
English translation of Amended Claims for Response to Office Action dated Oct. 11, 2013, Chinese Patent Application No. 201110024963.1.
Office Action dated Oct. 15, 2013, Chinese Patent Application No. 201110128898.7.
Gaming Voice Command & Control Interactive Software Pack v2—Published Date: 2007 http://www.broadenedhorizons.com/gamingvoicecontrol.htm.
Control Media Playback with Voice Commands—Published Date: Dec. 13, 2004 http://www.microsoft.com/windowsxp/using/mce/expert/ballew_04dec13.mspx.
Our Product—VR Commander—Published Date: 2006 http://www.vrcommander.com/Product.html.
Voice Buddy Interactive Voice Control Version 3.0—Published Date: 2009 http://www.edimensional.com/product_info.php?products_id=94.
Ahn, et al., Large Display Interaction using Video Avatar and Hand Gesture Recognition—Retrieved Date: Oct. 15, 2009, http:..www.imrc.kist.re.kr/~kij/LNCS_2004.pdf Image Analysis and Recognition, LNCS3211, Oct. 2004.
12160.org—Resisting the New World Order, "The New Xbox Natal Can Recognize a Player's Face and Automatically Log Them Into Their Xbox Profile," posted by TheLasersShadow, Jun. 2, 2009, http://snardfarker.ning.com/profiles/blogs/the-new-xbox-natal-can.
Freeman et al., "Computer Vision for Computer Games," IEEE 2nd Intl. Conf. on Automatic Face and Gesture Recognition, Killington, VT, Oct. 1996.
Qian, et al., "A Gesture-Driven Multimodal Interactive Dance System," 2004 IEEE International Conference on Multimedia and Expo (ICME), 2004, pp. 1579-1582.
Shivappa, et al., "Person Tracking With Audio-visual Cues Using the Iterative Decoding Framework," IEEE 5th International Conference on Advanced Video and Signal Based Surveillance, 2008, pp. 260-267.
Toyama, et al., "Probalistic Tracking in a Metric Space," Eighth International Conference on Computer Vision, Vancouver, Canada, vol. 2, Jul. 2001, 8 pages.
International Search Report dated Sep. 8, 2011, International Patent Application No. PCT/US2010/062655.
English Abstract of Japanese Patent Publication No. 2008-225985 published on Sep. 25, 2008.
Preliminary Amendment dated Jul. 14, 2011, U.S. Appl. No. 12/688,808, filed Jan. 15, 2010.
Non-Final Office Action dated Dec. 8, 2011, U.S. Appl. No. 12/688,808, filed Jan. 15, 2010.
Response to Office Action dated Dec. 20, 2011, U.S. Appl. No. 12/688,808, filed Jan. 15, 2010.
Final Office Action dated Mar. 22, 2012, U.S. Appl. No. 12/688,808, filed Jan. 15, 2010.
Response to Office Action dated Jul. 9, 2012, No. 12/688,808, filed Jan. 15, 2010.
Notice of Allowance and Fee(s) Due dated Aug. 6, 2012, U.S. Appl. No. 12/688,808, filed Jan. 15, 2010.
Vance, "Now, Electronics That Obey Hand Gestures", NYTimes.com, Jan. 11, 2010, 3 pages, http://www.nytimes.com/2010/01/12/technology/personaltech/12gesture.html?hp.
Keskin, "Real Time Hand Tracking and 3D Gesture Recognition for Interactive Interfaces Using HMM", In Proceedings of International Conference on Artificial Neural Networks, Istanbul, Turkey, 2002.
Jung, "Real-time Robust Body Part Tracking for Augmented Reality Interface", the 8th ACM SIGGRAPH International Conference on Virtual Reality Continuum and It's Applications in Industry (VRCAI), Dec. 14-15, 2009, pp. 203-208, Yokohama, Tokyo Institute of Technology, Japan.
Oka, "Real-Time Fingertip Tracking and Gesture Recognition", IEEE Computer Graphics and Applications, Nov. 2002, vol. 22, Issue 6, IEEE Computer Society Press, Los Alamitos, CA, USA.
Malik, "Real-time Hand Tracking and Finger Tracking for Interaction", CSC2503F Project Report, Department of Computer Science, Dec. 18, 2003, University of Toronto, Canada.
Non-Final Office Action dated Oct. 19, 2012, U.S. Appl. No. 12/778,790, filed May 12, 2010.
"Notice of Allowance Received for China Application No. 201110024963.1", Mailed Date: Jan. 26, 2014, Filed Date: Jan. 14, 2011, 4 Pages.
Response to Office Action dated May 20, 2014, U.S. Appl. No. 12/778,790 filed May 12, 2010.
Non-final Office Action dated Jun. 10, 2014, U.S. Appl. No. 12/778,790, filed May 12, 2010.
Response to Office Action dated May 31, 2013, U.S. Appl. No. 12/778,790, filed May 12, 2010.
Response to Office Action dated Jan. 30, 2013, Chinese Application No. 201110024963.1.

(56) References Cited

OTHER PUBLICATIONS

English translation of Summary of Response to Office Action, Amended Claims and Pending Claims dated Jan. 30, 2013, Chinese Application No. 201110024963.1.

Chinese Office Action dated Apr. 21, 2014, Chinese Patent Application No. 201110128898.7.

Final Office Action dated Nov. 10, 2014, U.S. Appl. No. 12/778,790, filed May 12, 2010.

Response to Officre Acrion dated Seo. 8, 2014, U.S. Appl. No. 12/778,790, filed May 12, 2010

Chinese Office Action dated Sep. 25, 2014, Chinese Patent Appplication No. 201110128898.7.

English translation of the Summary of the Final Rejection dated Sep. 25, 2014, Chinese Patent Application No. 201110128898.7.

Japanese Office Action dated Jan, 9, 2015, Japanese Oatent Application No. 2012-548953.

"Office Action Issued in Japanese Patent Application No. 2012-548953", Mailed Date: May 8, 2015, 6 Pages.

* cited by examiner

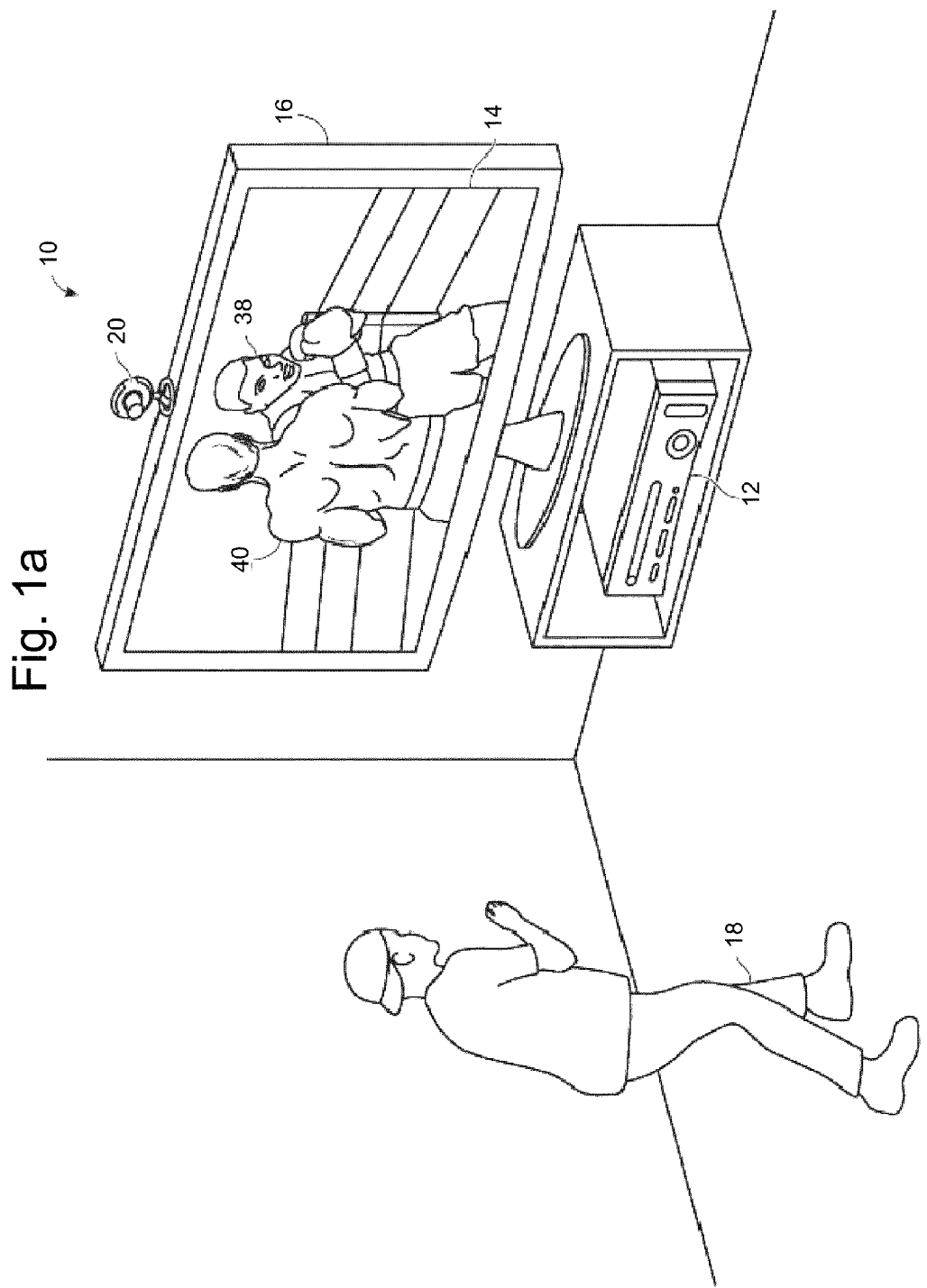

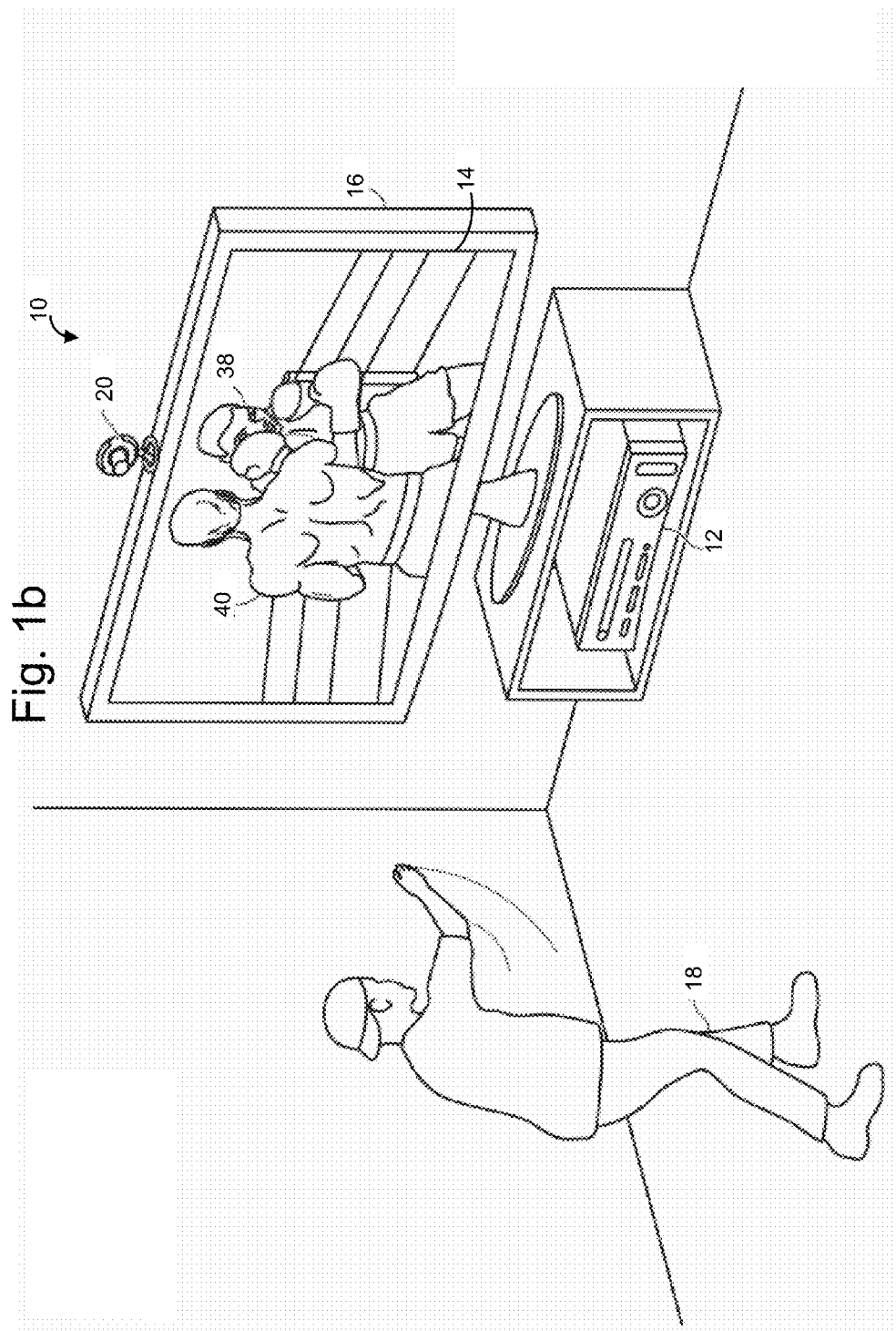

Computing Environment 220

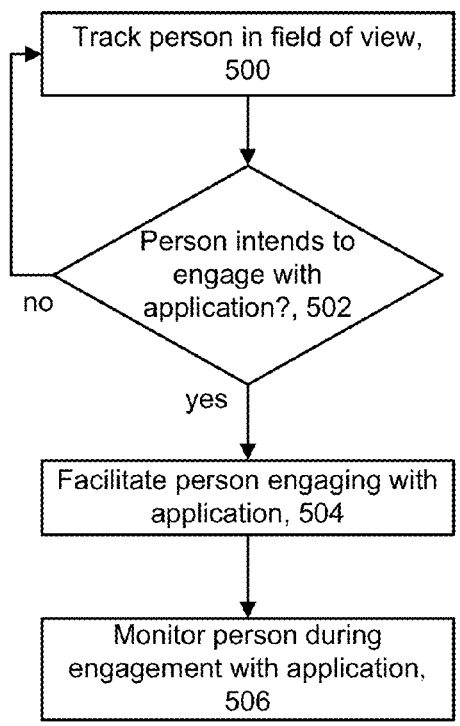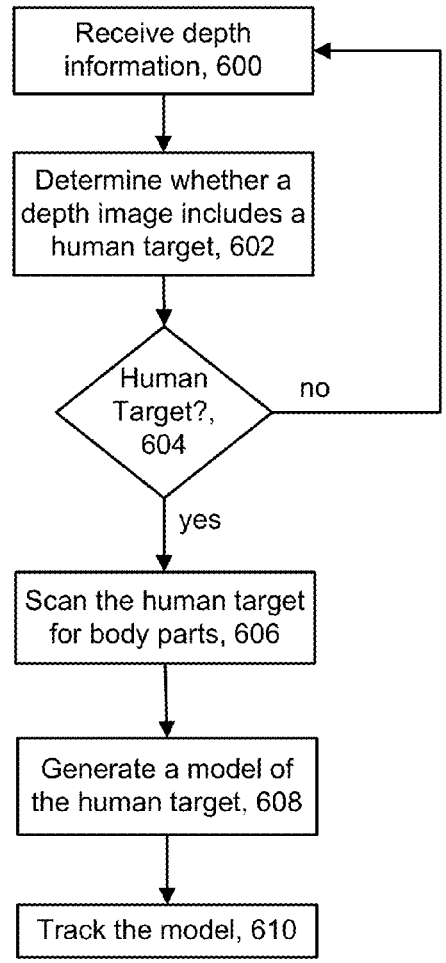

RECOGNIZING USER INTENT IN MOTION CAPTURE SYSTEM

CROSS-REFERENCE TO RELATED APPLICATIONS

This is a continuation application of U.S. patent application Ser. No. 12/688,808, entitled "Recognizing User Intent In Motion Capture System," by Markovic et al., filed Jan. 15, 2010, published as US 2011/0175810 on Jul. 21, 2011 and issued as U.S. Pat. No. 8,334,842 on Dec. 18, 2012, and incorporated by reference herein in its entirety.

BACKGROUND

Motion capture systems obtain data regarding the location and movement of a human or other subject in a physical space, and can use the data as an input to an application in a computing system. Many applications are possible, such as for military, entertainment, sports and medical purposes. For instance, the motion of humans can be mapped to a 3d human skeletal model and used to create an animated character or avatar. Optical systems, including those using visible and invisible, e.g., infrared, light, use cameras to detect the presence of a human in a field of view. Markers can be placed on the human to assist in detection, although markerless systems have also been developed. Some systems use inertial sensors which are carried by, or attached to, the human to detect movement. For example, in some video game applications, the user holds a wireless controller which can detect movement while playing a game. However, further refinements are needed which allow a human to interact more naturally with an application.

SUMMARY

A processor-implemented method, motion capture system and tangible computer readable storage are provided for recognizing a user's intent to interact with an application in a physical space which uses a motion capture system.

To maximize the accessibility of an entertainment or other experience which is offered by a motion capture system, a simplified and automatic technique is provided for people to enter and leave the experience, e.g., by logging in or logging out of the experience, with few or no explicit actions. The person is enabled to just walk up and begin playing in the motion capture system, walk away when finished playing, and return again to resume playing from where he or she left off. The intention of a person to engage with, or disengage from, the application is determined based on a location, movement, posture and/or voice data from a person. Moreover, the intention of other people such as spectators which are in a field of view of the motion capture system can also be detected.

In one embodiment, a processor-implemented method for recognizing an intent of a person to engage with an application in a motion capture system is provided. The method includes tracking the person's body in a field of view of the motion capture system. The tracking distinguishes the person in the field of view, such as by using a skeletal model to identify movements of the person. Based on the tracking, the method determines that the person does not intend to engage with the application at a first time, but does intend to engage with the application at a second time. When the person intends to engage with the application, he or she is allowed to engage with the application. Various steps are taken to facilitate the engagement, thereby alleviating any need for the person to provide manual inputs such as entering a password and login user id on a keyboard or other manual input device. Specifically, a profile and an avatar can be automatically generated and associated with the person. The avatar can be displayed in a virtual space on a display. The display is updated based on subsequent tracking of the person's body in the field of view, as the person engages with the application by moving the person's body to control the avatar.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIGS. 1a and 1b depict an example embodiment of a motion capture system in which a user interacts with an application which simulates a boxing match.

FIG. 2 depicts an example block diagram of the motion capture system 10 of FIG. 1a.

FIG. 3 depicts an example block diagram of a computing environment that may be used in the motion capture system of FIG. 1a.

FIG. 4 depicts another example block diagram of a computing environment that may be used in the motion capture system of FIG. 1a.

FIG. 5 depicts a method for enabling a person to interact with a motion capture system.

FIG. 6a depicts an example method for tracking movement of a person as set forth in step 500 of FIG. 5.

FIG. 6b depicts an example model of a person as set forth in step 608 of FIG. 6a.

FIG. 6c depicts another example model of a person as set forth in step 608 of FIG. 6a.

FIG. 7b depicts an example of a field of view in which a person's location is evaluated relative to a predefined location, as discussed in step 700 of FIG. 7a.

FIG. 7c depicts an example of a field of view in which a person's location is evaluated relative to another person, as discussed in step 700 of FIG. 7a.

FIG. 7d depicts an example of a field of view in which a person's movement is evaluated, as discussed in step 704 of FIG. 7a.

DETAILED DESCRIPTION

Figure 2:
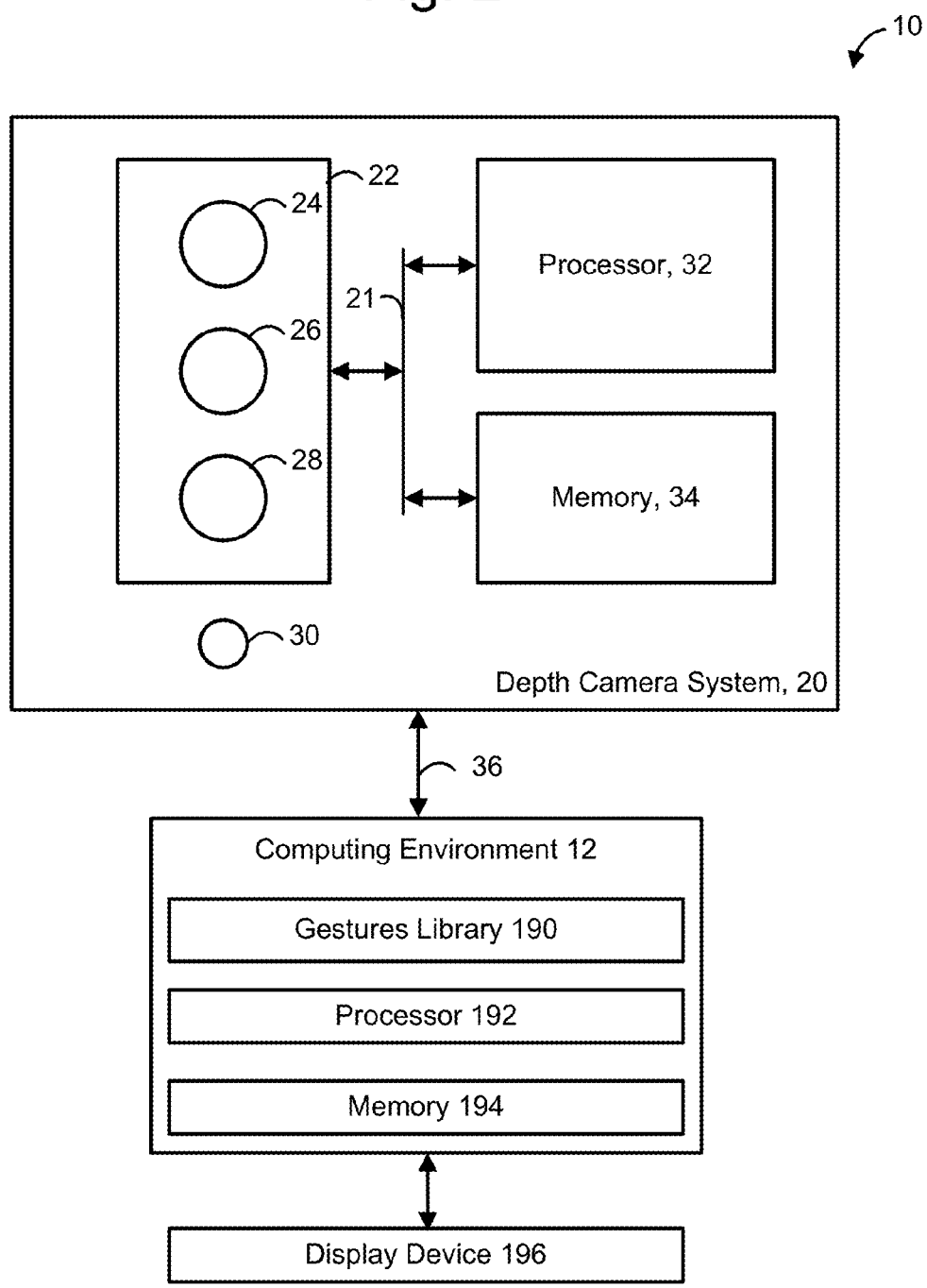

Various techniques are provided for allowing a person, or group of people, to easily interact with an application in a motion capture system. A depth camera system can track a person's location and movement in a physical space and evaluate them to determine whether the person intends to engage, e.g., interact, with the application. Additional information such as audio inputs from the physical space can also be used. In some cases, a person's movement or location is evaluated with respect to one or more other people in the field of view. Moreover, techniques are provided for determining when to activate an avatar for a person in the application, and when to modify a display to reflect whether or not a person is currently engaged with the application. When a person engages with an application at different times, information is stored so that the person can continue the engagement without loss of continuity. For example, in an application such as a game in which a person obtains a score, or gains certain powers based on his or her progress and time spent in the game, the person can resume playing without losing the progress which was previously made.

FIGS. 1a and 1b depict an example embodiment of a motion capture system 10 in which a person 18 interacts with an application which simulates a boxing match. The motion capture system 10 is used to recognize, analyze, and/or track a human target such as the person 18, also referred to as user or player.

As shown in FIG. 1a, the motion capture system 10 may include a computing environment 12 such as a computer, a gaming system or console, or the like. The computing environment 12 may include hardware components and/or software components to execute applications such as educational and/or entertainment purposes.

The motion capture system 10 may further include a depth camera system 20. The depth camera system 20 may be, for example, a camera that may be used to visually monitor one or more people, such as the person 18, such that gestures and/or movements performed by the people may be captured, analyzed, and tracked to perform one or more controls or actions within an application, such as animating an avatar or on-screen character, as will be described in more detail below.

The motion capture system 10 may be connected to a audiovisual device 16 such as a television, a monitor, a high-definition television (HDTV), or the like that provides a visual and audio output to the user. An audio output can also be provided via a separate device. To drive the audiovisual device 16, the computing environment 12 may include a video adapter such as a graphics card and/or an audio adapter such as a sound card that provides audiovisual signals associated with an application. The audiovisual device 16 may be connected to the computing environment 12 via, for example, an S-Video cable, a coaxial cable, an HDMI cable, a DVI cable, a VGA cable, or the like.

The person 18 may be tracked using the depth camera system 20 such that the gestures and/or movements of the person are captured and used to animate an avatar or on-screen character and/or interpreted as input controls to the application being executed by computer environment 12. Thus, according to one embodiment, the user 18 may move his or her body to control the application and/or animate an avatar or other on-screen character.

As an example, the application can be a boxing game in which the person 18 participates and in which the audiovisual device 16 provides a visual representation of a boxing opponent 38 to the person 18. The computing environment 12 may also use the audiovisual device 16 to provide a visual representation of a player avatar 40 which represents the person, and which the person can control with his or her bodily movements.

For example, as shown in FIG. 1b, the person 18 may throw a punch in physical space, e.g., a room in which the person is standing, to cause the player avatar 40 to throw a punch in a virtual space which includes a boxing ring. Thus, according to an example embodiment, the computer environment 12 and the depth camera system 20 of the motion capture system 10 may be used to recognize and analyze the punch of the person 18 in physical space such that the punch may be interpreted as an input to an application which simulates a boxing match, to control the player avatar 40 in the virtual space.

Other movements by the person 18 may also be interpreted as other controls or actions and/or used to animate the player avatar, such as controls to bob, weave, shuffle, block, jab, or throw a variety of different punches. Furthermore, some movements may be interpreted as controls that may correspond to actions other than controlling the player avatar 40. For example, in one embodiment, the player may use movements to end, pause, or save a game, select a level, view high scores, communicate with a friend, and so forth. The player may use movements to select the game or other application from a main user interface. Thus, a full range of motion of the user 18 may be available, used, and analyzed in any suitable manner to interact with an application.

The person can hold an object such as a prop when interacting with an application. In such embodiments, the movement of the person and the object may be used to control an application. For example, the motion of a player holding a racket may be tracked and used for controlling an on-screen racket in an application which simulates a tennis game. In another example embodiment, the motion of a player holding a toy weapon such as a plastic sword may be tracked and used for controlling a corresponding weapon in the virtual space of an application which provides a pirate ship.

The motion capture system 10 may further be used to interpret target movements as operating system and/or application controls that are outside the realm of games and other applications which are meant for entertainment and leisure.

For example, virtually any controllable aspect of an operating system and/or application may be controlled by movements of the person 18.

FIG. 2 depicts an example block diagram of the motion capture system 10 of FIG. 1*a*. The depth camera system 20 may be configured to capture video with depth information including a depth image that may include depth values, via any suitable technique including, for example, time-of-flight, structured light, stereo image, or the like. The depth camera system 20 may organize the depth information into "Z layers," or layers that may be perpendicular to a Z axis extending from the depth camera along its line of sight.

The depth camera system 20 may include an image camera component 22, such as a depth camera that captures the depth image of a scene in a physical space. The depth image may include a two-dimensional (2-D) pixel area of the captured scene, where each pixel in the 2-D pixel area has an associated depth value which represents a linear distance from the image camera component 22.

The image camera component 22 may include an infrared (IR) light component 24, a three-dimensional (3-D) camera 26, and a red-green-blue (RGB) camera 28 that may be used to capture the depth image of a scene. For example, in time-of-flight analysis, the IR light component 24 of the depth camera system 20 may emit an infrared light onto the physical space and use sensors (not shown) to detect the backscattered light from the surface of one or more targets and objects in the physical space using, for example, the 3-D camera 26 and/or the RGB camera 28. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the depth camera system to a particular location on the targets or objects.

According to another embodiment, the depth camera system 20 may include two or more physically separated cameras that may view a scene from different angles to obtain visual stereo data that may be resolved to generate depth information.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the image camera component 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The depth camera system 20 may further include a memory component 34 that may store instructions that are executed by the processor 32, as well as storing images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the 3-D camera 26 and/or the RGB camera 28, and/or a skeletal model that may be generated by the depth camera system 20 to the computing environment 12 via the communication link 36. The computing environment 12 may then use the model, depth information, and captured images to control an application. For example, as shown in FIG. 2, the computing environment 12 may include a gestures library 190, such as a collection of gesture filters, each having information concerning a gesture that may be performed by the skeletal model (as the user moves). For example, a gesture filter can be provided for each of: raising one or both arms up or to the side, rotating the arms in circles. flapping one's arms like a bird, leaning forward, backward, or to one side, jumping up, standing on one's toes by raising ones heel's, walking in place, walking to a different location in the field of view/physical space, and so forth. By comparing a detected motion to each filter, a specified gesture or movement which is performed by a person can be identified. An extent to which the movement is performed can also be determined.

The data captured by the depth camera system 20 in the form of the skeletal model and movements associated with it may be compared to the gesture filters in the gesture library 190 to identify when a user (as represented by the skeletal model) has performed one or more specific movements. Those movements may be associated with various controls of an application.

The computing environment may also include a processor 192 for executing instructions which are stored in a memory 194 to provide audio-video output signals to the display device 196 and to achieve other functionality as described herein.

Figure 3:
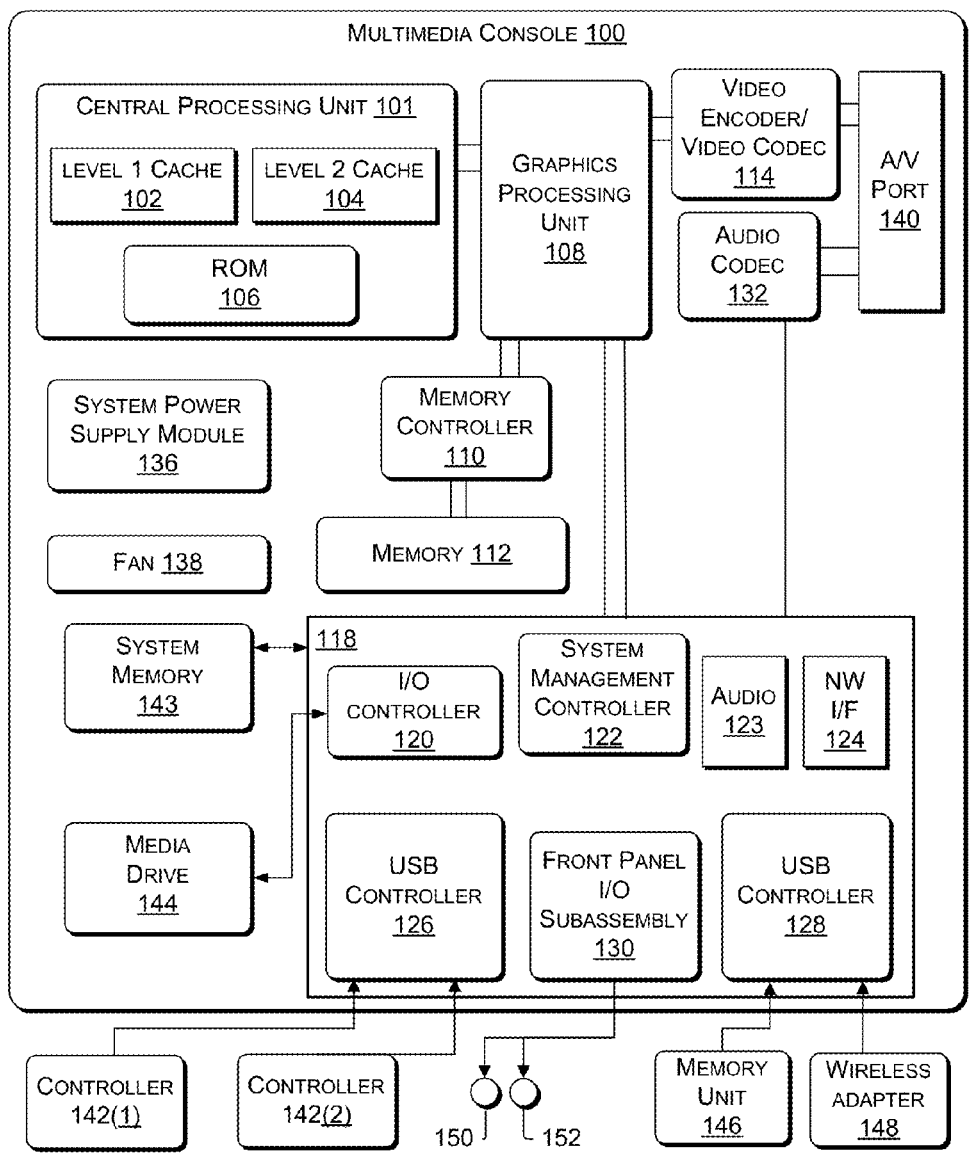

FIG. 3 depicts an example block diagram of a computing environment that may be used in the motion capture system of FIG. 1a. The computing environment can be used to interpret one or more gestures or other movements and, in response, update a visual space on a display. The computing environment such as the computing environment 12 described above with respect to FIGS. 1a, 1b and 2 may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from the depth camera system 20 of FIG. 2, including the cameras 26 and 28.

Figure 4:
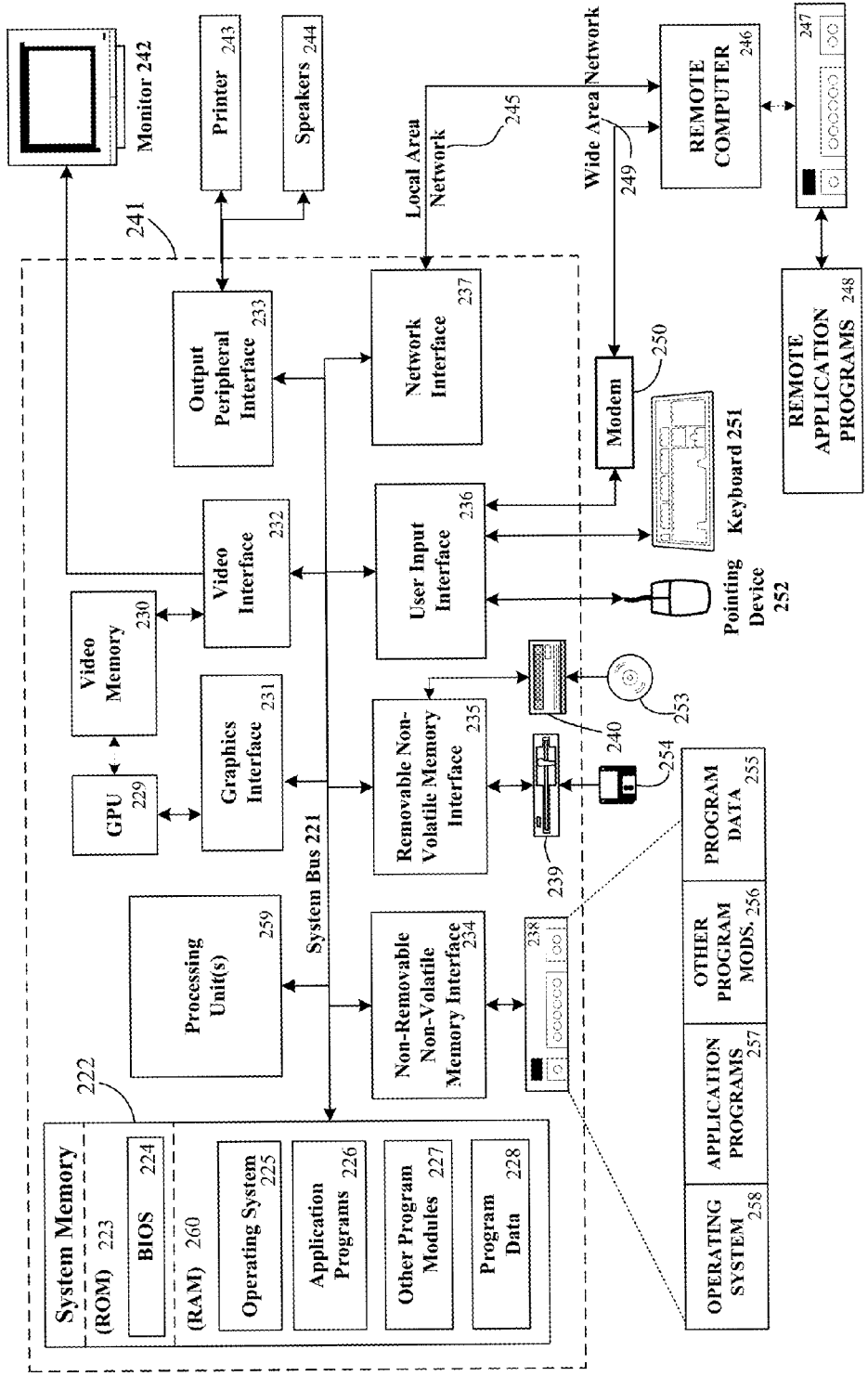

FIG. 4 depicts another example block diagram of a computing environment that may be used in the motion capture system of FIG. 1a. The computing environment can be used to interpret one or more gestures or other movements and, in response, update a visual space on a display. The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 4, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including cameras 26 and 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 4. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 depicts remote application programs 248 as residing on memory device 247. It will be appreciated that the network connections shown are exemplary and other means of establishing a communications link between the computers may be used.

FIG. 5 depicts a method for enabling a person to interact with a motion capture system. Step 500 includes tracking a person's movement and location in a field of view of a motion capture system. Further details of step 500 are provided in connection with FIGS. 6a-c. Decision step 502 determines if the person intends to engage with the application. Further details of step 502 are provided in connection with FIGS. 7a-d and 10a. Generally, step 502 can determine a probability that a person has a specified intention, based on one or more variables, and trigger a resulting action if the probability is sufficiently high.

If the person does not intend to engage, the tracking of step 500 continues. If decision step 502 is true, step 504 facilitates the person in engaging with the application. Further details of step 504 are provided in connection with FIGS. 8a, 8b and 10b-10f. Step 506 includes monitoring the person during engagement with the application. Further details of step 506 are provided in connection with FIGS. 9a-9d.

For example, the method of FIG. 5 may determine that a person does not intend to engage with the application at a first time, such as when the person first enters the field of view, but does intend to engage with the application at a later, second time, such as when the person has been in the field of a view for a few seconds. Note that the person may have an intent to engage formed in his or her mind when first entering the field of view, but the motion capture system has not yet determined the intent because the person has not yet been observed for a sufficiently long time. If the application is in an inactive mode at the first time, it can be set to an active mode at the second time, in response to determining that the person intends to engage with the application. In the inactive mode, the normal visual or audio output of the application may be suppressed, e.g., by providing a blank screen or screen saver display, while in the active mode, the normal visual or audio output may be provided.

FIG. 6a depicts an example method for tracking movement of a person as set forth in step 500 of FIG. 5. The example method may be implemented using, for example, the depth camera system 20 and/or the computing environment 12, 100 or 220 as discussed in connection with FIGS. 2-4. One or more people can be scanned to generate a model such as a skeletal model, a mesh human model, or any other suitable representation of a person. The model may then be used to interact with an application that is executed by the computing environment. The scanned to generate the model can occur when an application is started or launched, or at other times as controlled by the application of the scanned person.

The person may be scanned to generate a skeletal model that may be tracked such that physical movements or motions of the user 58 may act as a real-time user interface that adjusts and/or controls parameters of an application. For example, the tracked movements of a person may be used to move an avatar or other on-screen character in an electronic role-playing game; to control an on-screen vehicle in an electronic racing game; to control the building or organization of objects in a virtual environment; or to perform any other suitable control of an application.

According to one embodiment, at step 600, depth information is received, e.g., from the depth camera system. The depth camera system may capture or observe a field of view that may include one or more targets. In an example embodiment, the depth camera system may obtain depth information associated with the one or more targets in the capture area using any suitable technique such as time-of-flight analysis, structured light analysis, stereo vision analysis, or the like, as discussed. The depth information may include a depth image having a plurality of observed pixels, where each observed pixel has an observed depth value, as discussed.

The depth image may be downsampled to a lower processing resolution so that it can be more easily used and processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model, discussed in connection with FIGS. 6b and 6c.

At decision step 604, a determination is made as to whether the depth image includes a human target. This can include flood filling each target or object in the depth image comparing each target or object to a pattern to determine whether the depth image includes a human target. For example, various depth values of pixels in a selected area or point of the depth image may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern, which will be described in more detail below.

If decision step 604 is true, step 606 is performed. If decision step 604 is false, additional depth information is received at step 600.

The pattern to which each target or object is compared may include one or more data structures having a set of variables that collectively define a typical body of a human. Information associated with the pixels of, for example, a human target and a non-human target in the field of view, may be compared with the variables to identify a human target. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target with the variables to determine whether and which of the targets may be human. For example, matches between the variables and the target that have larger weight values may yield a greater likelihood of the target being human than matches with smaller weight values.

Step 606 includes scanning the human target for body parts. The human target may be scanned to provide measurements such as length, width, or the like associated with one or more body parts of a person to provide an accurate model of the person. In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target. For example, according to one embodiment, measurement values determined by the scanned bitmask may be used to define one or more joints in a skeletal model, discussed in connection with FIGS. 6b and 6c. The one or more joints may be used to define one or more bones that may correspond to a body part of a human.

For example, the top of the bitmask of the human target may be associated with a location of the top of the head. After determining the top of the head, the bitmask may be scanned downward to then determine a location of a neck, a location of the shoulders and so forth. A width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like. Some body parts such as legs, feet, or the like may be calculated based on, for example, the location of other body parts. Upon determining the values of a body part, a data structure is created that includes measurement values of the body part. The data structure may include scan results averaged from multiple depth images which are provide at different points in time by the depth camera system.

Figure 6B:
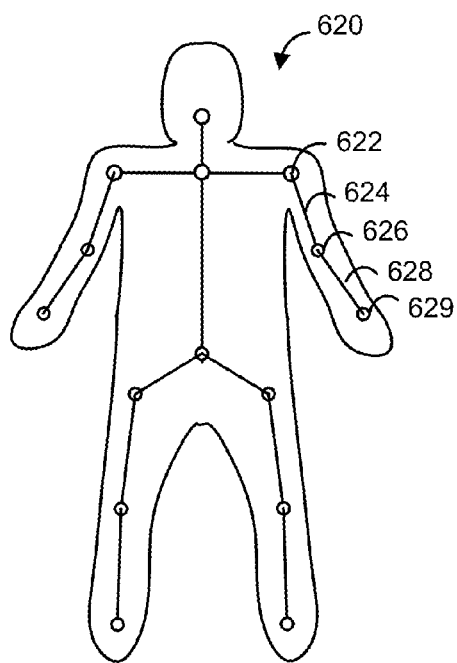
Figure 6C:
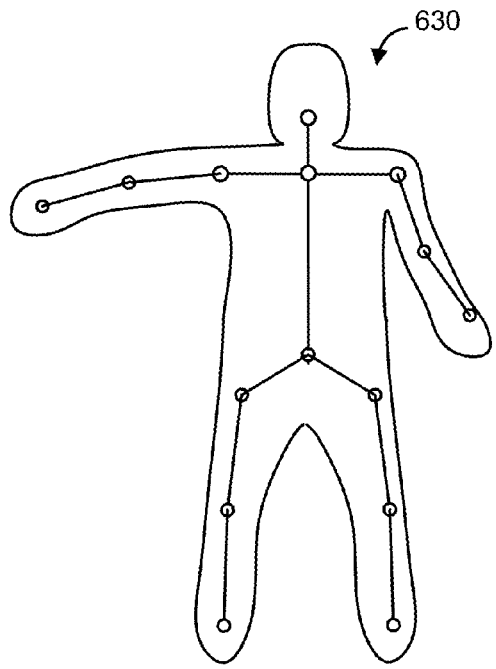

Step 608 includes generating a model of the human target. In one embodiment, measurement values determined by the scanned bitmask may be used to define one or more joints in a skeletal model. The one or more joints are used to define one or more bones that correspond to a body part of a human. For example, FIG. 6b depicts an example model 620 of a person as set forth in step 608 of FIG. 6a, and FIG. 6c depicts another example model 630 of a person as set forth in step 608 of FIG. 6a.

Generally, each body part may be characterized as a mathematical vector defining joints and bones of the skeletal model. Body parts can move relative to one another at the joints. For example, a forearm segment 628 is connected to joints 626 and 629 and an upper arm segment 624 is connected to joints 622 and 626. The forearm segment 628 can move relative to the upper arm segment 624.

One or more joints may be adjusted until the joints are within a range of typical distances between a joint and a body part of a human to generate a more accurate skeletal model. The model may further be adjusted based on, for example, a height associated with the human target.

At step 610, the model is tracked by updating the person's location several times per second. As the user moves in the physical space, information from the depth camera system is used to adjust the skeletal model such that the skeletal model represents a person. In particular, one or more forces may be applied to one or more force-receiving aspects of the skeletal model to adjust the skeletal model into a pose that more closely corresponds to the pose of the human target in physical space.

Generally, any known technique for tracking movements of a person can be used.

Figure 7A:
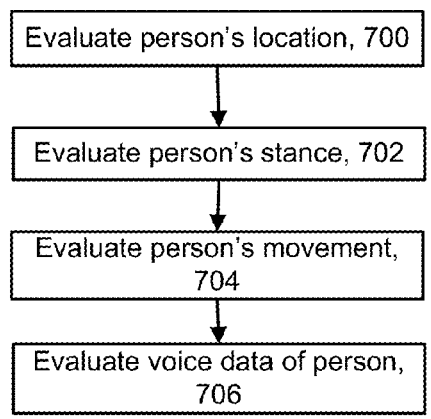
FIG. 7a depicts an example method for determining if a person intends to engage with an application as set forth in step 502 of FIG. 5.

FIG. 7a depicts an example method for determining if a person intends to engage with an application as set forth in step 502 of FIG. 5. A variety of factors can be considered in determining the intent of a person. One or more of the factors can be used. Moreover, the factors provided can indicate either an intent to engage with an application or an intent to not engage (or to disengage) as related but opposite concepts. For example, a low probability of intent to engage may be equivalent to a high probability of intent to not engage. The factors can be evaluated frequently, e.g., multiple times per second, over a period of time such as a few seconds to gain a better understanding of the person's intent.

Figure 7B:
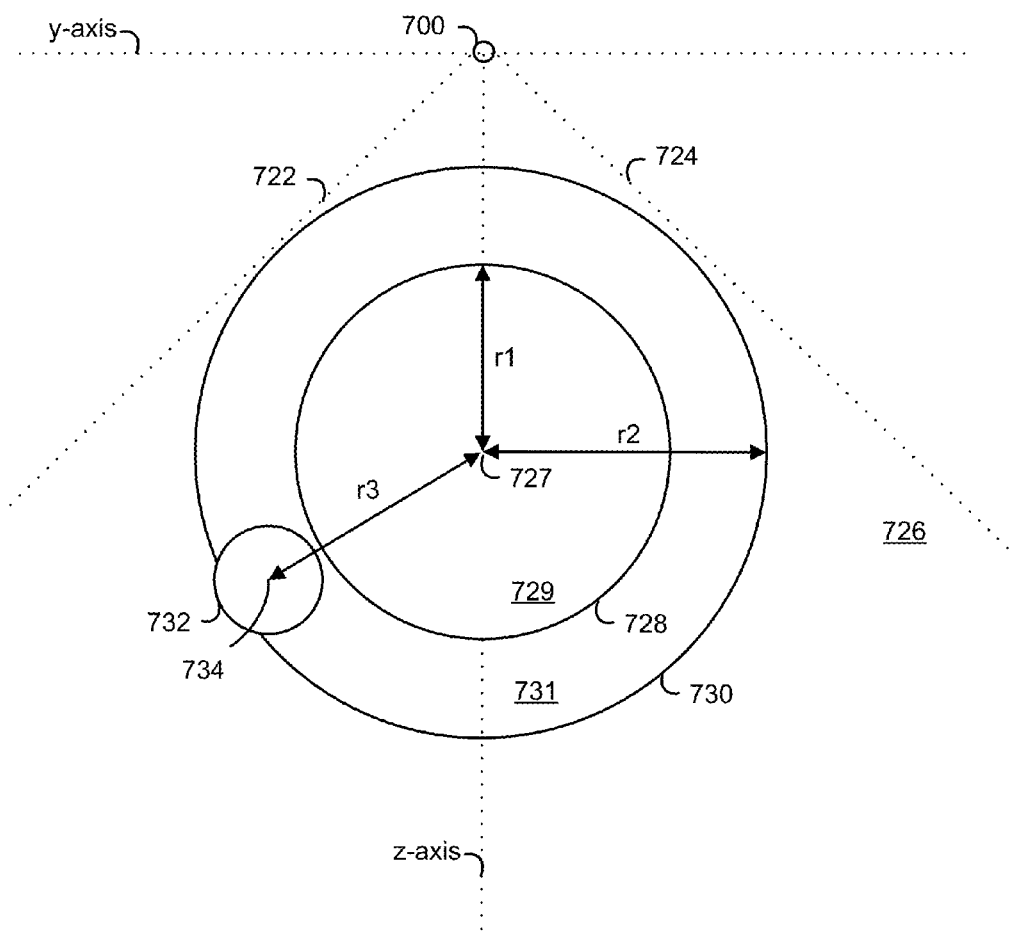

Step 700 evaluates a person's location in the field of view, e.g., in a physical space such as a room. For example, FIG. 7b depicts an example of a field of view in which a person's location is evaluated relative to predefined location. Point 700 represents the depth camera and lines 722 and 724 represent boundaries of the field of view 726. A coordinate system may be defined which includes an optical axis or z-axis of the depth camera, e.g., a line that extends in a center of a direction in which the depth camera sees the physical space, where the field of view is typically symmetrical about the optical axis. If the depth camera faces in the same direction as the display, the optical axis is generally perpendicular to the plane of the display. A cross axis (y-axis) can be defined which is perpendicular to the z-axis. A first zone 729 is circular and has a radius r1, perimeter 728, and a center point 727 along the z-axis. A second zone 731 is annular or ring-shaped, has an inner radius r1, an outer radius r2, inner perimeter 728, outer perimeter 730, and is concentric with, and adjacent to, the first zone 729. The use of circular and concentric zones is an example only as other zone shapes can be used, e.g., oval, rectangular, square, etc. A circle 732 with a center point 734 represents a bounding cylinder which contains a person whose intent to engage with an application is being evaluated. The center point 734 of the person is a distance r3 from the center point 727. A bounding box or rectangle can be used as an alternative to a bounding cylinder.

For instance, the person may be in a location, e.g., the first zone 729, in which an intent to interact with the application is highly probable, a location, e.g., zone 731 in which an intent to interact with the application is moderately probable, or a location in the field of view 762 which is outside the zones 729 and 731, in which an intent to interact with the application is less probable. A location-based probabilistic measure can thereby be made based on the person's location relative to the location in which an intent to interact with the application is most probable, e.g., zone 729.

Figure 7C:
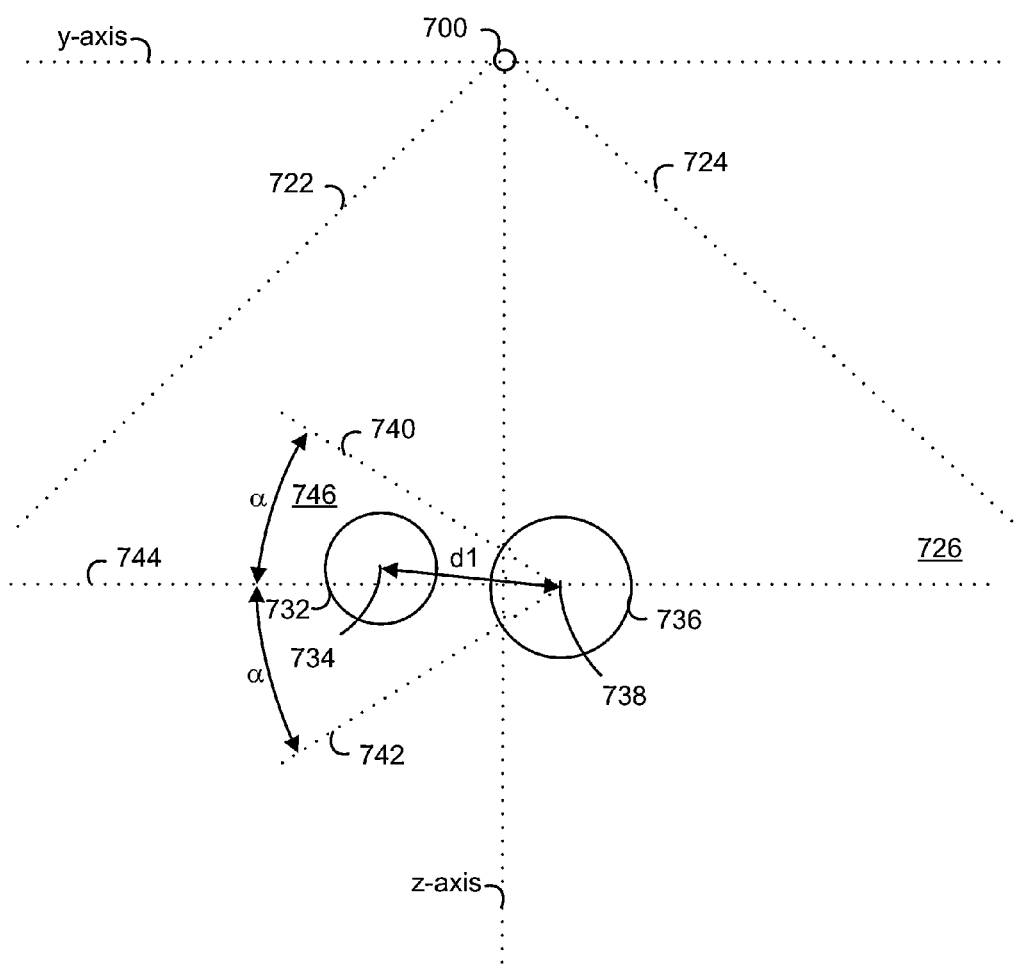
Figure 7D:
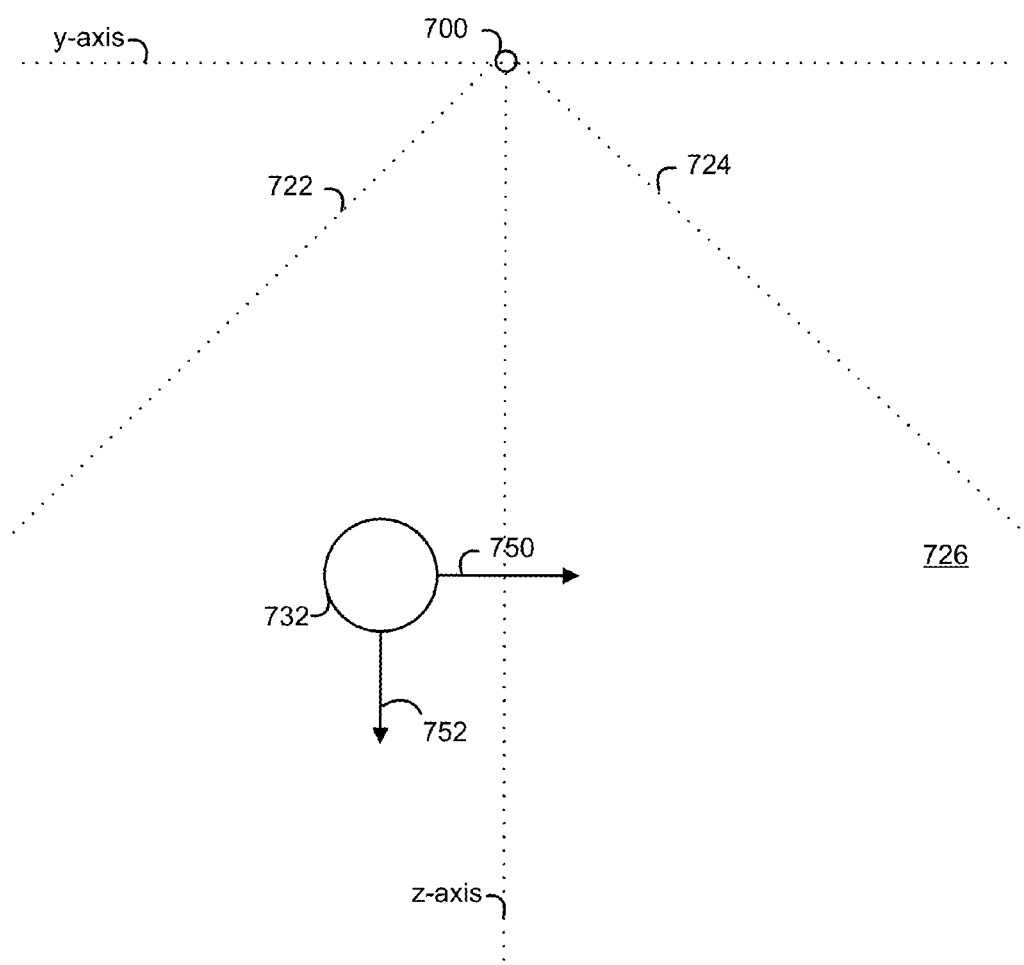

The location of a person can also be evaluated relative to a location of another person in the field of view which is currently engaged with the application. For example, a person who intends to engage with the application may stand next to another person who is already engaged with the application, as a potential team mate or competitor in game, for instance. A determination can be made that the person is to the side of, and within a specified distance of, the other person in the field of view who is engaging with the application. For example, FIG. 7c depicts an example of a field of view in which a person's location is evaluated relative to another person. Here, a circle 736 with center point 738 represents a bounding cylinder which contains a person who is currently engaged with the application, and the circle 732 with center point 734 represents a bounding cylinder which contains a person whose intent to engage with the application is being evaluated. Axis 744 is parallel to the y-axis and passes through the center point 736. Lines 740 and 742 pass through the center point 738 at an angle of +/−α relative to the axis 744. A region 746 can be defined which is between the lines 740 and 742 in which a person is considered to be at the side or abreast of the person represented by circle 736. A similar region can be defined on the other side of the person 736. d1 is a distance from the center point 738 to the center point 734 and represents a distance between the respective people depicted by circles 736 and 732. A distance could alternatively be defined which is the smallest distance between the circumferences of the circles 736 and 732.

Here, a greater probability of intent to engage can be associated with the person represented by circle 732 being in the region 746 (e.g., to the side of the person represented by circle 736) than when the person represented by circle 732 is not in the region 746. Similarly, a greater probability of intent to engage can be associated with the person represent by circle 732 being in the region 746 at a relatively close distance d1 to the person represent by circle 736 than when the person represent by circle 732 is in the region 746 at a relatively far distance from the person represent by circle 738.

Step 702 evaluates the person's stance or pose. For example, if the person's body is facing the depth camera with shoulders squared away toward the depth camera (e.g., people 1022 and 1024 in FIG. 10b), it is more probable that the person intends to engage with the application than if the person's body is not facing the camera, e.g., with shoulders squared away in another direction (e.g., person 1026 or 1028 in FIG. 10a). In this latter case, the depth camera sees a profile of the person. A pose in which the person is sitting down (e.g., person 1028 in FIG. 10a) or lying down similarly is probably not indicative of an intent to engage with the application. Similarly, a stance of crossing one's arms across the chest can signal no intent to engage.

As an example of intent to engage which is specific to the application context, consider an application relating to yoga exercises, in which case a sitting pose might signal an intent to engage rather than an intent to disengage. Moreover, the criteria for determining an intent to engage or disengage could be adjusted based on factors such as age, gender, physical fitness level or disability. For instance, a movement by a slower person could be an intent to engage while for a faster person it would not.

Timers may be used to determine how long a particular stance is maintained. A longer duration may be associated with a greater intent to engage or disengage.

A stance-based probabilistic measure can be made based on the person's stance relative to a stance in which an intent to interact with the application is most probable.

Step 704 evaluates the person's movement in the field of view. For example, if the person is moving quickly across the field of view (e.g., as represented by a person 1026 in a field of view 1021 in FIG. 10*a*, or in a direction of an arrow 750 for a person represented by the circle 732 in FIG. 7*d*), the person is probably just walking through the field of view and does not intend to engage with the application. Or, if the person is moving away from the display (e.g., in a direction of an arrow 752 for the person represented by the circle 732 in FIG. 7*d*), the user probably does not intend to engage with the application. Moreover, if the person is generally in one location but appears to be animated, such when moving his or her arms around (e.g., as represented by a person 1024 in FIG. 10*a*), or shifting weight from one foot to another, this may be associated with a higher probability of an intent to engage with the application. Similarly, if the person is generally in one location and appears to be very still, this may be associated with a lower probability of an intent to engage with the application. Moreover, movement and location factors can be related, e.g., movement toward a location which has a high probability of intent to engage can be a sign of a high probability of intent to engage.

Gestures made by a person could also be considered as a form of movement. For instance, a user may raise his or her arm and wave at the depth camera to indicate that the person intends to engage. Moreover, certain gesture relating to intent can be specific to the application context, e.g., context sensitive gestures. For instance, there may be gestures which are predefined as signaling intent to engage or disengage. A gesture can be identified based on movement (e.g., in the case of detecting the raising of a person's arm to the side and then lowering it) or static position (e.g., in the case of detecting that a person's arm is raised to the side).

A movement-based probabilistic measure can be made based on the person's movement relative to a movement in which an intent to interact with the application is most probable.

Step 706 evaluates voice data of the person. Generally, vocal sounds of a person can include spoken words, whistling, shouts and other utterances. Non-vocal sounds such as clapping the hands can also be detected. A directional microphone can optionally be used to detect a direction from which a sound is detected and correlate it with a detected location of a person to provide an even more reliable measure of the probability that a person intends to engage with an application. Voice data alone can be sufficient to determine intent of a person even when the person is out of the field of view.

The presence of voice data may be correlated with an increased probability that a person intends to engage with the application. Moreover, the volume or loudness of the voice data may be correlated with an increased probability that a person intends to engage with the application. Also, speech can be detected so that commands such as "start" or "ready" indicate an intent to engage with the application. Thus, determining that a person intends to engage with an application can include processing voice data of the person and detecting speech which indicates an intent to engage with the application and/or detecting a voice volume which indicates an intent to engage with the application.

In an example of a trivia game show application, players are normally relatively static, perhaps sitting on a couch, and answer questions. In this case, the detection of the presence of a new voice can be evaluated as an intent to engage by a new person. Similarly, the absence of a previously recognized voice of a person for a period of time can be evaluated as an intent to disengage by that now-silent person.

A voice-based probabilistic measure can be made based on a person's voice data relative to voice data in which an intent to interact with the application is most probable.

Once it is determined that a person intends to engage with an application, the engagement is facilitated, as discussed next. Note that appropriate status information can be provided as feedback when it is determined that a person intends to engage with the application, or at other appropriate times, such as when disengaging. For example, an audio message such as a doorbell sound can be generated by the application when a person is determined to have an intent to engage with the application, and the sound of a door shutting can be generated by the application when a person is determined to have an intent to disengage from the application.

A visual message, such as an icon, can also be provided on the display, such as in an unobtrusive side or bottom region of the display. The visual message can indicate the number of currently engaged persons, as well as changes in status, such as when a person's engagement is suspended (see FIG. 9*a*), or when the person disengages (see FIG. 9*b*). Visual effects can be provided so that a new avatar is faded in when joining a virtual space and an avatar which is leaving is faded out. Clear feedback is provided so that the people understand when they are or are not bound to the application. If all players disengage, the application can be paused or otherwise inactivated.

Figure 8A:
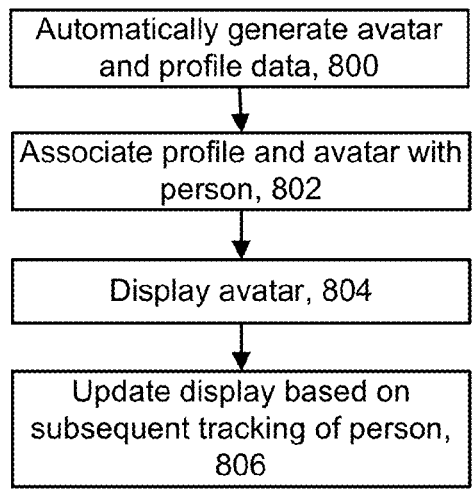
FIG. 8a depicts an example method for facilitating a person in engaging with an application as set forth in step 504 of FIG. 5.

FIG. 8*a* depicts an example method for facilitating a person in engaging with an application as set forth in step 504 of FIG. 5. Step 800 includes automatically generating an avatar and profile data. Step 802 includes automatically associating the profile and avatar with the person. Step 804 includes displaying the avatar on the display, and step 806 includes updating the display, e.g., in real-time, based on subsequent tracking of the person. If the person is the only person who is currently engaging with the application, the application may transition from a standby or mode to a ready mode in which it is ready to receive inputs based on the user's movements.

The person does not have to go through any type of manual setup process to engage with the application, and can therefore begin interacting with application without the delay, in a "just walk up and play" approach. No hardware such as a keyboard, mouse or hand held controller is needed to begin interacting.

The avatar which is automatically generated and associated with the person can be based on detected characteristics of the person, such as their height, width, skeletal model, RGB color data from the person's clothes, and so forth, and optionally audio characteristics such as voice tone and volume. Or a default, generic avatar can be provided. It is also possible for a person to modify an automatically generated avatar using an appropriate user interface. The person does not have to go through any type of manual setup process to configure an avatar, and can therefore begin interacting with application using an avatar without delay. In some applications, the avatar can be modified in its appearance or other traits as the avatar explores a virtual space. An avatar's traits can also relate to capabilities (e.g., "powers") which are gained or lost in the virtual space. In some cases, the person buys traits for the avatar using real or play money, and wins or loses traits by the avatar's actions in the virtual space. The profile data can also include the traits or other characteristics of the avatar. When a person stops engaging with an application and later returns, the profile data can be accessed to restore the person and his or her avatar to the state which existed when the person disengaged.

The profile which is generated can include the detected characteristics of the person, such as their height, width, skeletal model, RGB color data from the person's clothes, and so forth, and optionally audio characteristics such as voice tone and volume. The person can be bound to the application by binding his or her characteristics to the application. Generally, characteristics such as skeletal data can be bound to a person when the person enters the field of view. Profile data can thus include an identification of the person, including physical characteristics which are determined by the depth camera.

Profile data can also include information which represents the person's interactions with the application. For example, in a game application, the profile data can indicate the score or progress which the person has achieved, and a location in a virtual space of the person's avatar. The virtual space is provided on a display such as a computer monitor, television screen or projected on a wall. The virtual space can represent any real or imaginary, indoor or outdoor location. The virtual space can include an avatar which represents the person, and which moves based on the tracked movements of the person. The avatar can depict the user in a photorealistic manner, or may be an animal, vehicle or other character or object.

Optionally, in a networked approach, multiple people concurrently engage with an application from different locations. For example, first and second friends may have separate first and second motion capture systems, respectively, in their homes. They can arrange to begin interacting in a virtual space at the same time. The first motion capture system tracks the first person's body in the field of view of the first motion capture system, as the first person engages with the application by moving his or her body to control a first avatar in the field of view. The first motion capture system also receives data via a network from the second motion capture system, which tracks the second person's body in the field of view of the second motion capture system, as the second person engages with the application from a remote location by moving his or her body to control a second avatar in the virtual space. In response to the data, the first application displays the second avatar in the virtual space on the display with the first avatar, and updates the display as the second person continues to engage with the application by moving their body to control the second avatar. The second motion capture system can similarly receive data via the network from the first motion capture system so that the second person can view both avatars on his or her display. Thus, both people experience the same audio-visual output.

The display of the avatar and/or virtual space can be adjusted based on whether another person is currently engaged with the application, as discussed next.

Figure 8B:
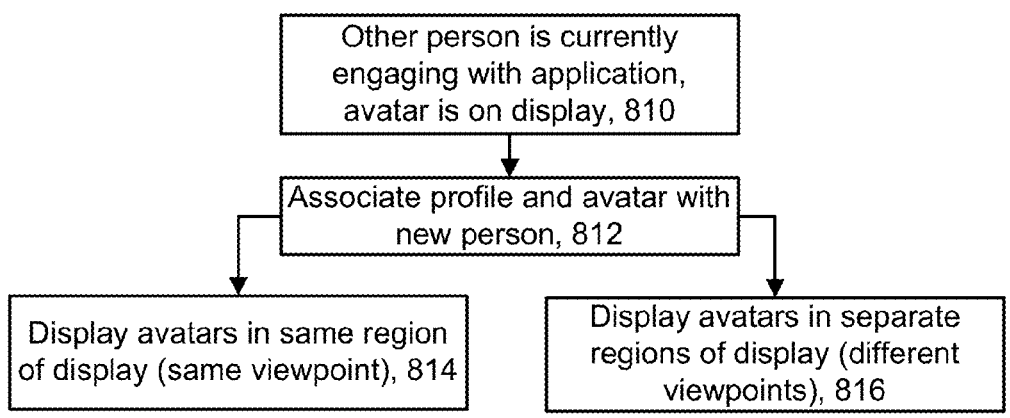
FIG. 8b depicts an example method for facilitating a person in engaging with an application as set forth in step 504 of FIG. 5, when another user is currently engaging with the application.

FIG. 8b depicts an example method for facilitating a person in engaging with an application as set forth in step 504 of FIG. 5, when another user is currently engaging with the application. At step 810, a determination is made that another person is currently engaged with an application, and his or her avatar is on the display. Step 812 associates a profile and avatar with the new person, e.g., the person who is newly recognized as having an intent to engage with the application. Different options are possible in updating the display to depict the new person's avatar. In one approach, at step 814, the avatars are displayed in the same region of the display, so that they are viewed from the same viewpoint. An example is provided in FIG. 10b, discussed further below. In another approach, at step 816, the avatars are displayed in separate regions of the display, so that they can be viewed from different respective viewpoints. An example is provided in FIG. 10c, discussed further below.

Figure 9A:
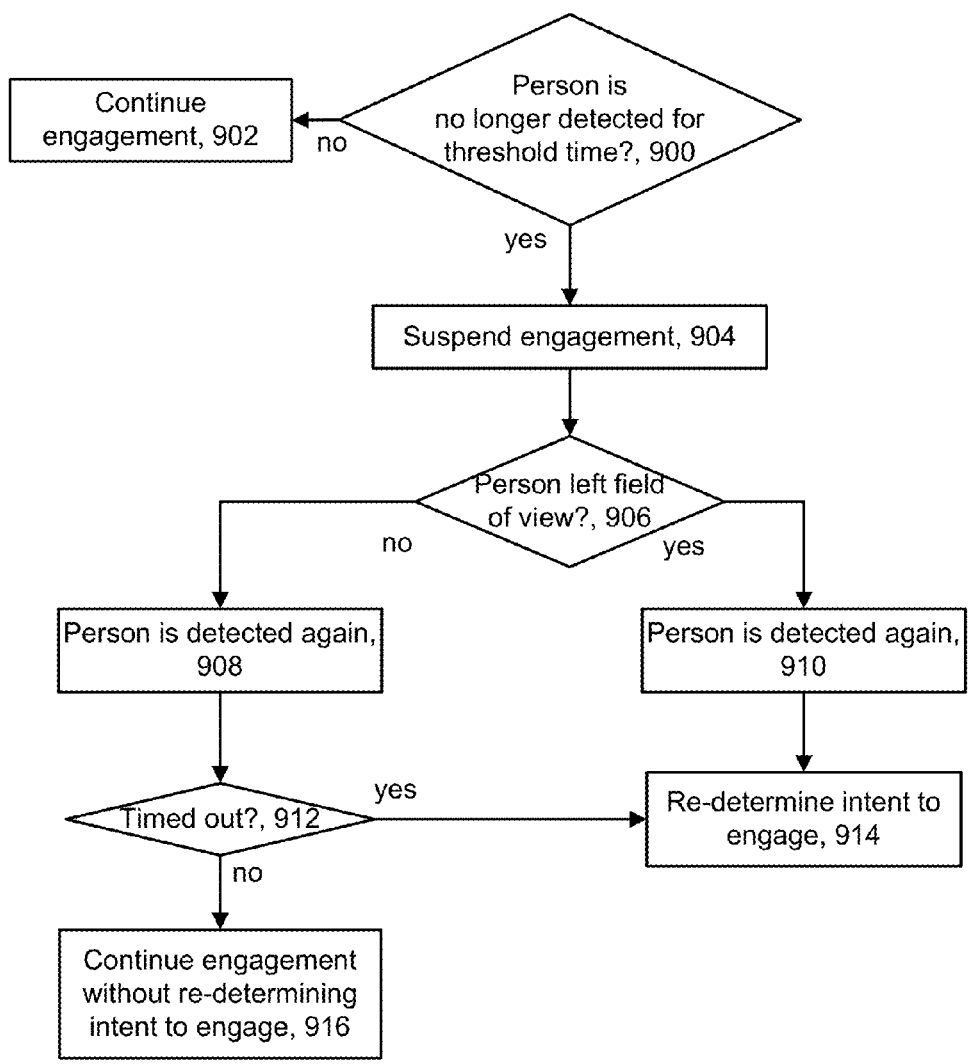
FIG. 9a depicts an example method for monitoring a person during engagement with an application as set forth in step 506 of FIG. 5.

FIG. 9a depicts an example method for monitoring a person during engagement with an application as set forth in step 506 of FIG. 5. Various scenarios may be encountered when a person is engaging with an application. For example, the person may be no longer detected due to the person being blocked by another person or object in the field of view, the person leaving the field of view, or the person not being detected for some other reason. In an example method for handling such scenarios, decision step 900 determines if a person is no longer detected for a threshold period of time, e.g., which can correspond to some number of detection cycles. Typically, there are several detection cycles per second. An appropriate threshold period of time can be determined by testing. If decision step 900 is false, the person continues the engagement with the application at step 902. For instance, the avatar can remain on the display.

If decision step 900 is true, step 904 suspends the person's engagement with the application. This can include providing an appropriate visual and/or audible message. Additionally, the person's avatar can be deactivated so that it is removed from the virtual space. The avatar can be displayed instead in a separate region of the display which indicates it is temporarily inactive. Or, the avatar can remain in the virtual space but have a grayed out appearance for instance, which indicates it is not active, e.g., so that it cannot be moved. In cases where there are multiple engaged persons and a separate screen region is allocated to each person (such as in FIG. 10c), the suspension could include updating the display so that the screen region of the suspended person is removed (such as in FIG. 10b).

Optionally, decision step 906 determines if the person was tracked leaving the field of view. This can be determined, e.g., by tracking the person's movement in the field of view to determine if they person moved in the direction of a boundary of the field of view and subsequently could no longer be detected. If decision step 906 is false, then it assumed that the person is still in the field of view, but perhaps is blocked by another person or an object, e.g., an item of furniture, and cannot be detected by the depth camera. In this case, when the person is subsequently detected again, at step 908. The same person which was previously detected, then no longer detected, then detected again can be identified based on physical characteristics of the person such as a skeletal model.

Decision step 912 determines if the person timed out, which means the engagement was suspended for longer than a specified period of time, e.g. several minutes. If decision step 912 is false, the engagement of the person is continued without re-determining an intent to engage, at step 916. As before, an appropriate visual and/or audible message can be provided by the application. The continuing of the engagement can include re-activating the avatar, for instance. In cases where there are one or more other still-engaged persons, the suspension could include updating the display so that a separate screen region is provided for the person whose engagement was continued (such as in FIG. 10c). If decision step 912 is true, the person's intent to engage with the application is re-determined anew, at step 914, before the person can engage again. Thus, the person is treated as being disengaged until he or she demonstrates the intent to engage again.

If decision step 906 is true, the person has left the field of view. In this case, when the person is subsequently detected again, at step 910, the person's intent to engage with the application is re-determined anew, at step 914, before the person can engage again.

An example in FIG. 5 indicated that a person does not intend to engage with the application at a first time, such as when first entering the field of view, but does intend to engage with the application at a later, second time, such as a couple of seconds later. In an example of FIG. 9b, the person intends to disengage with the application at a third time, after the second time, in response to which the profile and avatar are automatically stored, indexed to an identifier of the person. Further, the person demonstrates an intent to re-engage with the application at a fourth time, after the third time, in response to which the person re-engages with the application based on the stored profile and avatar.

Figure 9B:
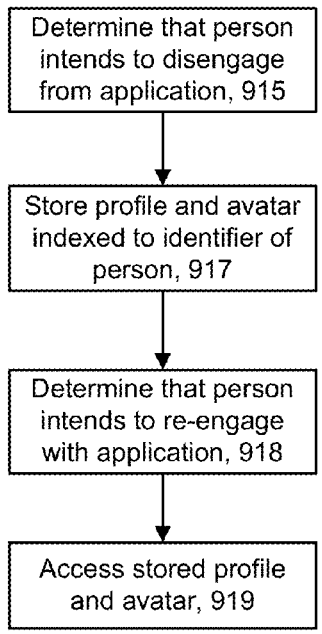
FIG. 9b depicts an example method for monitoring a person during engagement with an application as set forth in step 506 of FIG. 5, where the person disengages from, and then re-engages with, the application.

FIG. 9b depicts an example method for monitoring a person during engagement with an application as set forth in step 506 of FIG. 5, where the person disengages from, and then re-engages with, the application. In this case, the person may be currently detected in the field of view, and currently engaged with the application, when one or more factors indicate that the person intends to disengage from the application (step 915). Generally, the same factors discussed in connection with FIG. 7a can be used to determine an intent to engage or disengage. For example, if the person is in a location in the field of view which is associated with a low probability of intent to engage, this corresponds to a high probability of an intent to disengage. If the person has a stance which is associated with a low probability of intent to engage, this corresponds to a high probability of an intent to disengage. If the person has a movement which is associated with a low probability of intent to engage, this corresponds to a high probability of an intent to disengage. Movements which indicate an intent to disengage include the person walking away from the display, turning their back on the display (while standing still or walking way), walking away from the location in which an intent to engage is most probable, and/or walking toward a boundary of the field of view and then out of the field of view. The lack of voice data from a person for a specified period of time can also be associated with a higher probability of an intent to disengage.

As an example of intent to disengage which is specific to the application context, consider an application which requires substantial back and forth, forward and back movements in the physical space by a person. In this case, the criteria for intent to disengage can be adjusted to allow for such larger movements. In an application which does not require substantial movements, a substantial movement could be considered a sign of intent to disengage. Or, for an application relating to yoga exercises, a sitting pose might be expected and should not be considered a sign of intent to disengage.

Step 917 stores profile data and avatar data indexed to an identifier of the person. The identifier can be associated with physical characteristics of the person such as height and width, and skeletal model, voice data which can be associated with a specific person based on tone and other factors, color data such as color of clothing, and so forth. The person could also speak a recognized command such as "goodbye" or "stop." Some time later, step 918 determines that the person intends to re-engage with the application. Step 919 accesses the stored profile and avatar data so the person can re-engage with the application at the same place he or she left off when disengaging to maintain the continuity of the person's experience.

Figure 9C:
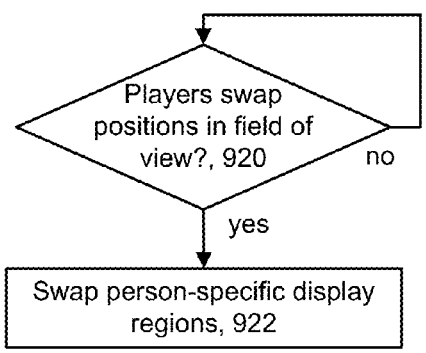
FIG. 9c depicts an example method for monitoring a person during engagement with an application as set forth in step 506 of FIG. 5, and following the method of FIG. 8b, where players swap positions in a field of view of the motion capture system.

FIG. 9c depicts an example method for monitoring a person during engagement with an application as set forth in step 506 of FIG. 5, and following the method of FIG. 8b, where players swap positions in a field of view of the motion capture system. Decision step 920 determines if players swap positions in the field of view. If they do, the person-specific display regions are also swapped, at step 922. For example, as depicted in FIG. 10c, a region 1005 of the display 1004 provides an avatar 1023 for the person 1022, and a region 1006 of the display 1004 provides an avatar 1025 for the person 1024. Thus, the display regions are positioned correspondingly to the people in the physical space, with the left side display region for the left side person and the right side display region for the right side person. When interacting when the application, the people may swap positions, e.g., right to left and left to right. For example, some applications involve significant moving around by the people in the physical space, so that a fixed position is not maintained. A person may therefore naturally move sideways in the physical space. In some case, one person blocks the other person's view to the display so that the blocked person moves sideways and positions are swapped.

Figure 10A:
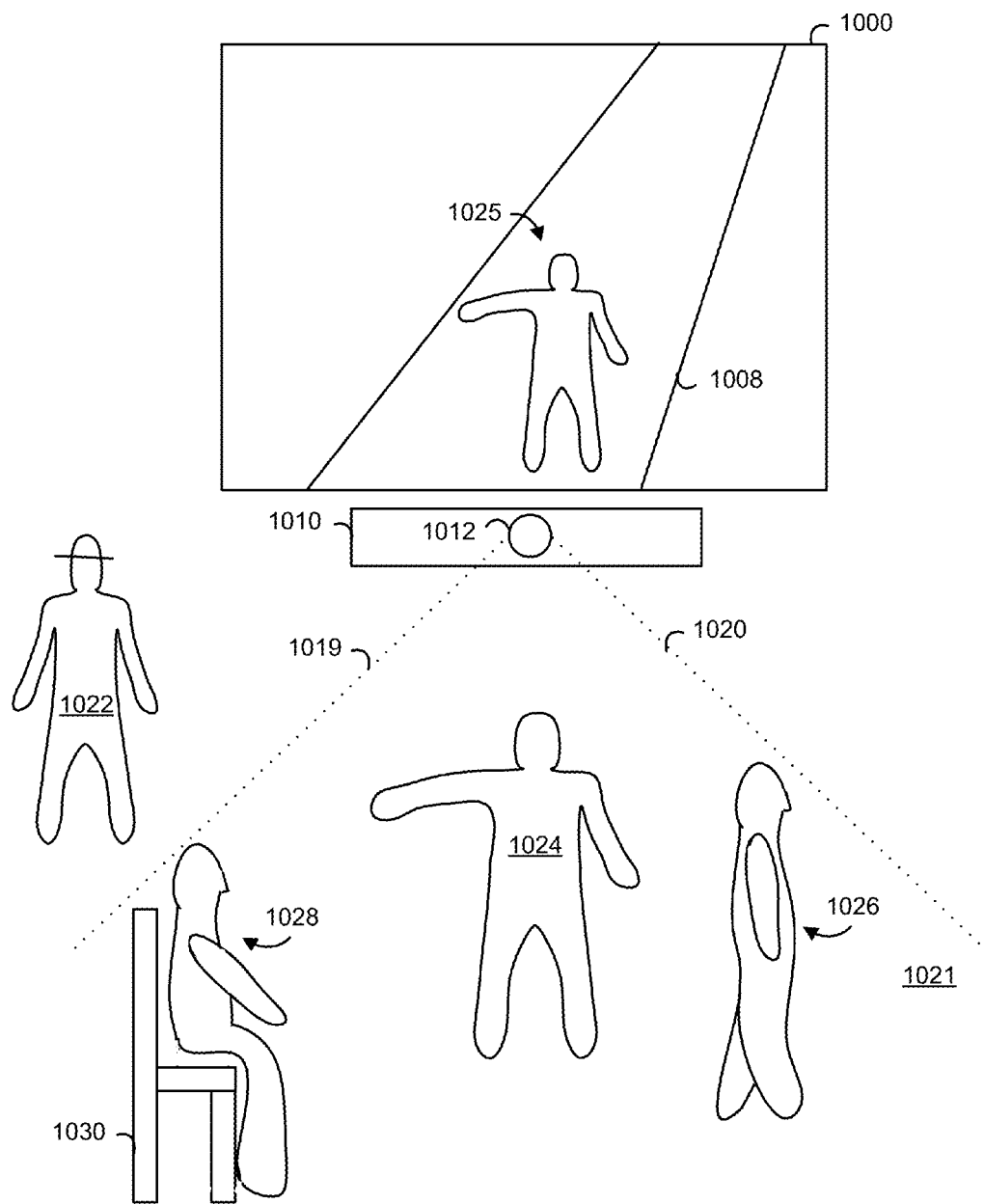
FIG. 10a depicts an example where one person is engaged with an application, and other people are not engaged with the application.
Figure 10B:
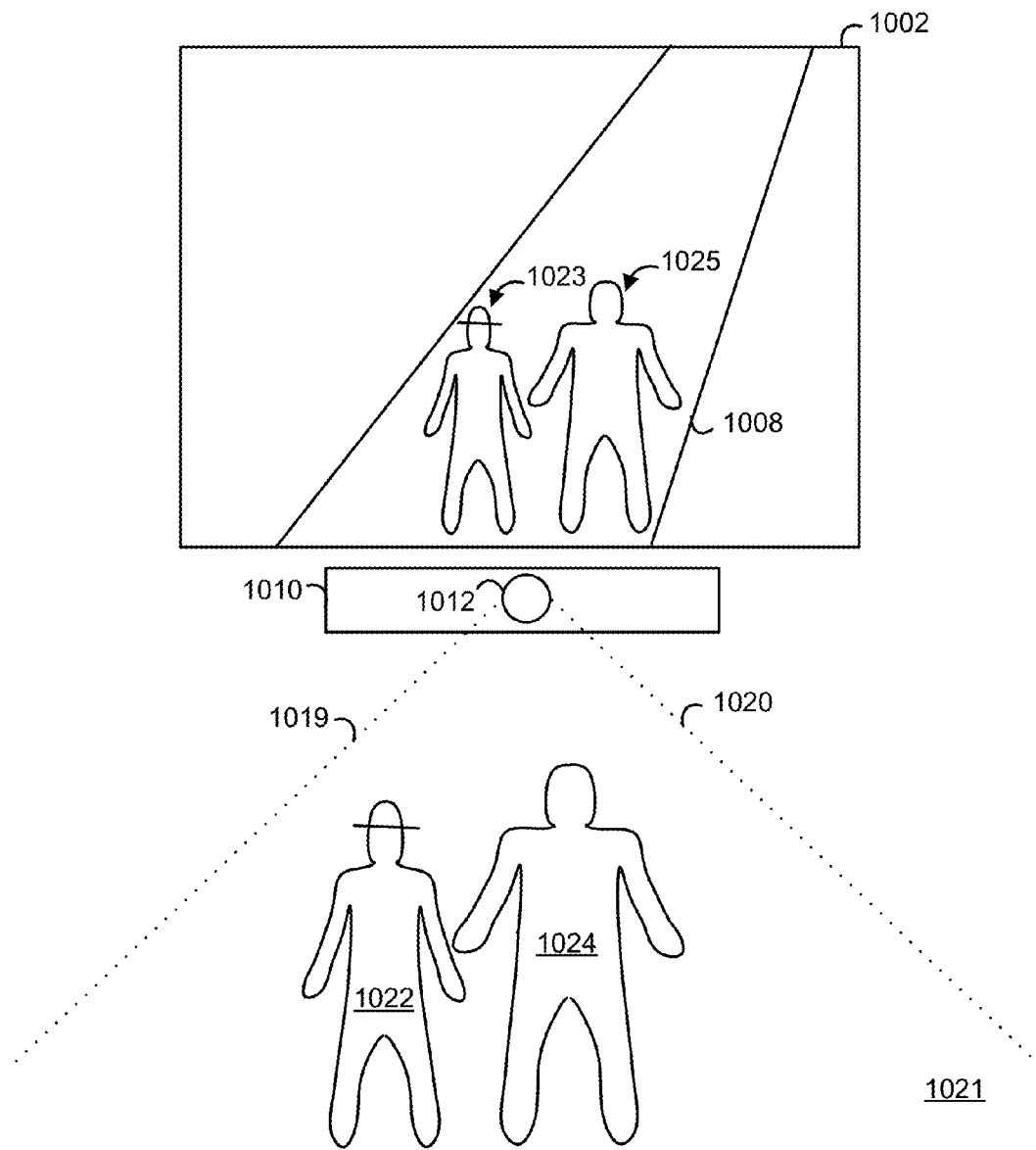
FIG. 10b depicts an example display where two people are engaged with an application, and have a common point of view of a virtual space on a display.
Figure 10C:
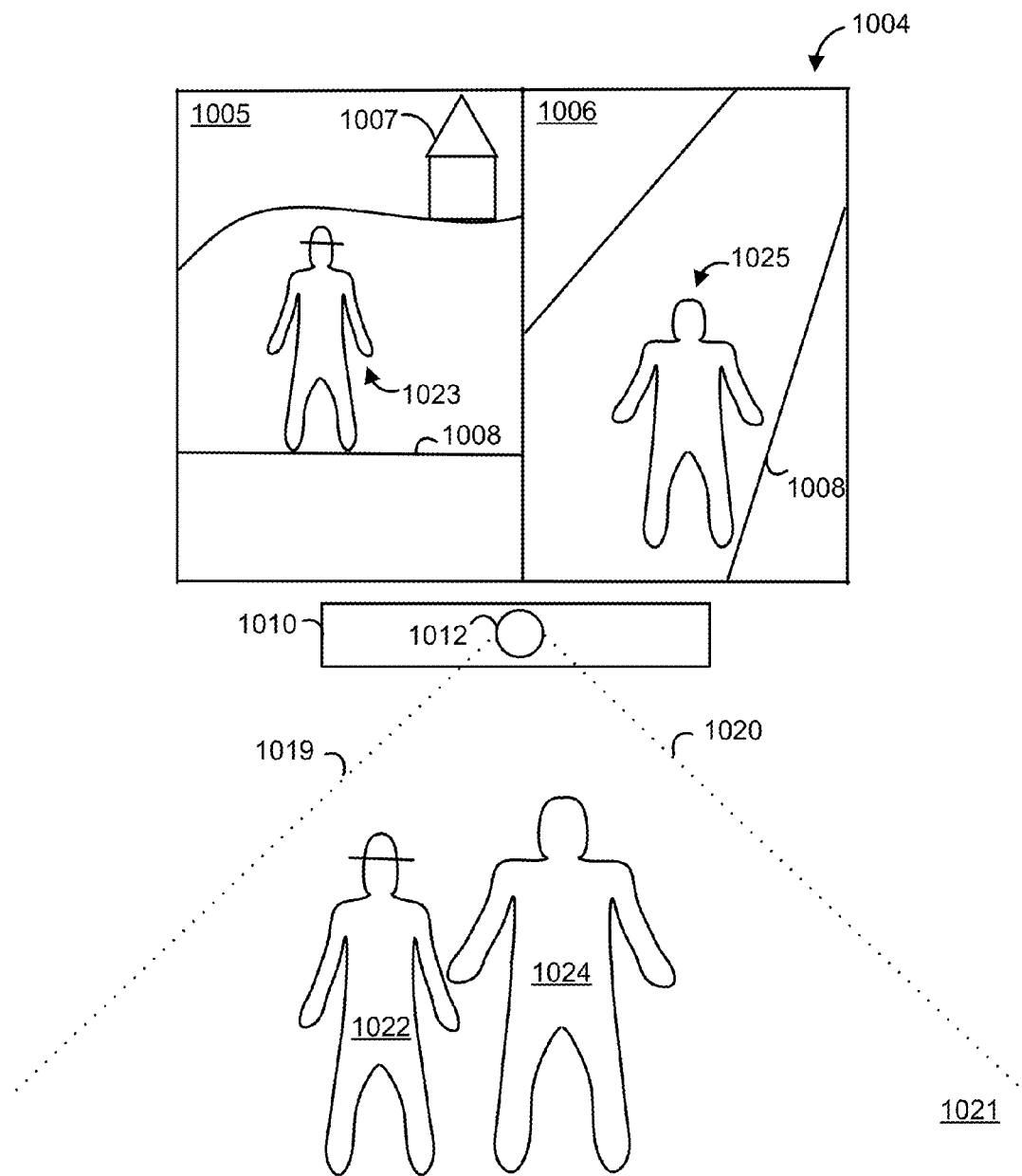
FIG. 10c depicts an example split screen display where two people are engaged with an application, and have different points of view of a virtual space on a display.
Figure 10D:
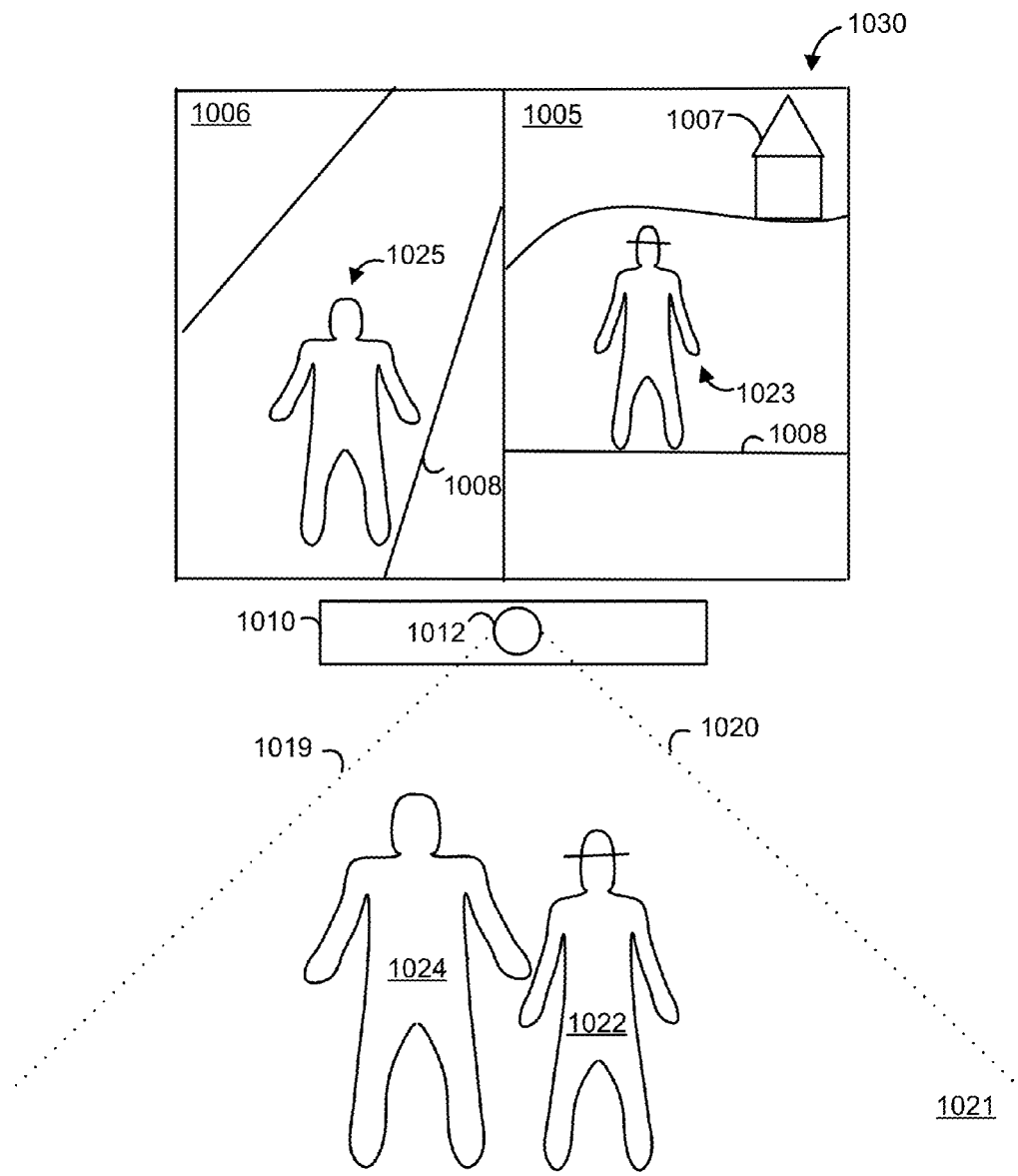
FIG. 10d depicts an example split screen display where display regions are swapped when the people swap positions in a physical space, relative to the display regions of FIG. 10c.

If the people 1022 and 1024 swap positions so that the person 1024 is on the left and person 1022 is on the right, as depicted in FIG. 10d, then the display regions 1005 and 1006 are swapped accordingly, with display region 1005 moving to the right hand side and display region 1006 moving to the left hand side.

Generally, transitions from a single display region to two or more display regions, and back can be automatically provided. Note that transitions involving more than two display regions are also possible. For example, a transition from two display regions to three display regions is possible when two players who have their own display regions are joined by a third player. Each display region can be positioned correspondingly to the players' positions in the physical space. Moreover, it is possible for the display regions to be stacked vertically, one on top of the other. For example, one player could be higher than another due to sanding on a higher surface in the field of view, so that the display region for the higher player is provided above that for the lower player.

Care should be taken to avoid too-frequent changes in the number of display regions, or in swapping display regions. After one change, a minimum time may be set for allowing another change. In some cases, an engaged person can be temporarily blocked by another engaged person or a spectator, and therefore cannot be tracked. For continuity in such cases, the display regions should continue to respond as normally as possible.

Figure 9D:
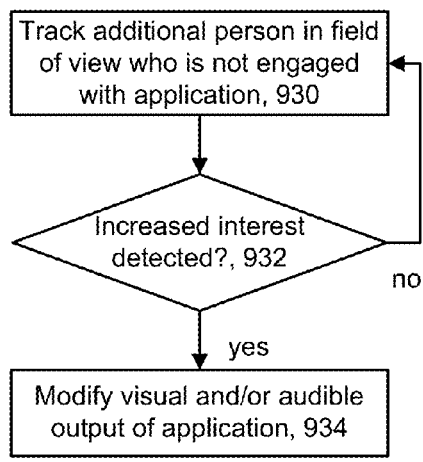
FIG. 9d depicts an example method for monitoring a person during engagement with an application as set forth in step 506 of FIG. 5, where an output of the application is modified based on tracking of an additional person who is not engaged with the application.

FIG. 9d depicts an example method for monitoring a person during engagement with an application as set forth in step 506 of FIG. 5, where an output of the application is modified based on tracking of an additional person who is not engaged with the application. In addition to tracking a person to determine if they intend to engage with an application, it is possible to determine the intent of other people in the field of view and to provide a corresponding input to an application. For example, one or more people may be in the field of view as spectators to watch another person engage with the application, such as to cheer him or her on. Step 930 includes tracking an additional person in the field of view who is not currently engaged with the application, e.g., does not control an avatar in the virtual space on the display. Decision step 932 determines if the additional person has an increased interest in the application. This can be determined using a variety of factors including those discussed in connection with FIG. 7a. Moreover, other factors which relate to actions that an interested spectator would perform can also be detected. For example, one or more people might be detected at some distance behind or to the side of the engaged person. The one or more people might perform an action such as standing up or raising their arms above their heads to cheer, or emitting a loud audible cheer.

If decision step 932 is false, the tracking of step 930 continues. If decision step 932 is true, step 934 modifies a visual and/or audible output of the application. For example, in an application in which the person's avatar is running or driving, an appropriate response to an audience cheering a person on might be to provide the avatar with enhanced capabilities, such as a speed boost or to play louder, faster paced background music to enhance the entertainment experience.

An example scenario includes tracking movement of a first person (who is already engaged with the application) in a field of view of the motion capture system, including distinguishing the first person's body in the field of view, where the first person interacts with the application by moving the first person's body to control an avatar in a virtual space on a display. While tracking the movement of the first person, step 930 involves tracking at least one additional person in the field of view who is not engaged with the application and does not control an avatar in the virtual space on the display. When the tracking the at least one additional person indicates a predefined criterion is met regarding a behavior of the at least one additional person, at decision step 932, a visual and/or audible output of the application is modified at step 934. The predefined criterion can include the at least one additional person moving (e.g., standing up, raising arms) in a way which indicates an increased level of interest in the application, or making a sound (e.g., cheer, clapping) which indicates increased interest in the application.

Figure 9E:
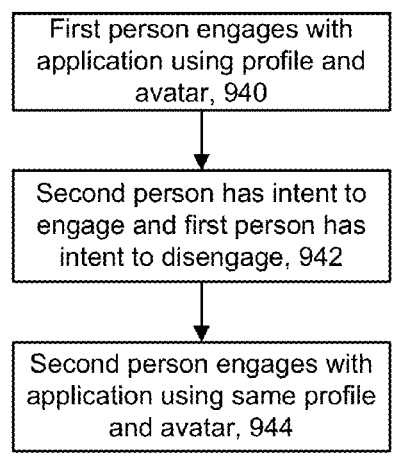
FIG. 9e depicts an example method for monitoring a person during engagement with an application as set forth in step 506 of FIG. 5, where one person takes the place of another in engaging with an application.

FIG. 9e depicts an example method for monitoring a person during engagement with an application as set forth in step 506 of FIG. 5, where one person takes the place of another in engaging with an application. At step 940, a first person engages with an application using a profile and avatar. At step 942, a second person has an intent to engage and the first person has an intent to disengage. At step 944, the second person engages with the application using the same profile and avatar as used by the first person. In this case, control of the avatar in the same state in the virtual space is taken over by the second person. For instance, in a game application, the same score or progress level which was reached by the first person is handed off to the second person to maintain continuity. This is in contrast to using a different avatar and profile for the second person. It is also possible for a new avatar to be provided for the second person while maintaining continuity of other profile data such as score or progress level. Another possibility is to maintain continuity of the new avatar but use different profile data. For example, the second person could start a new game with a reset score, but using the same avatar as the first person.

Figure 10E:
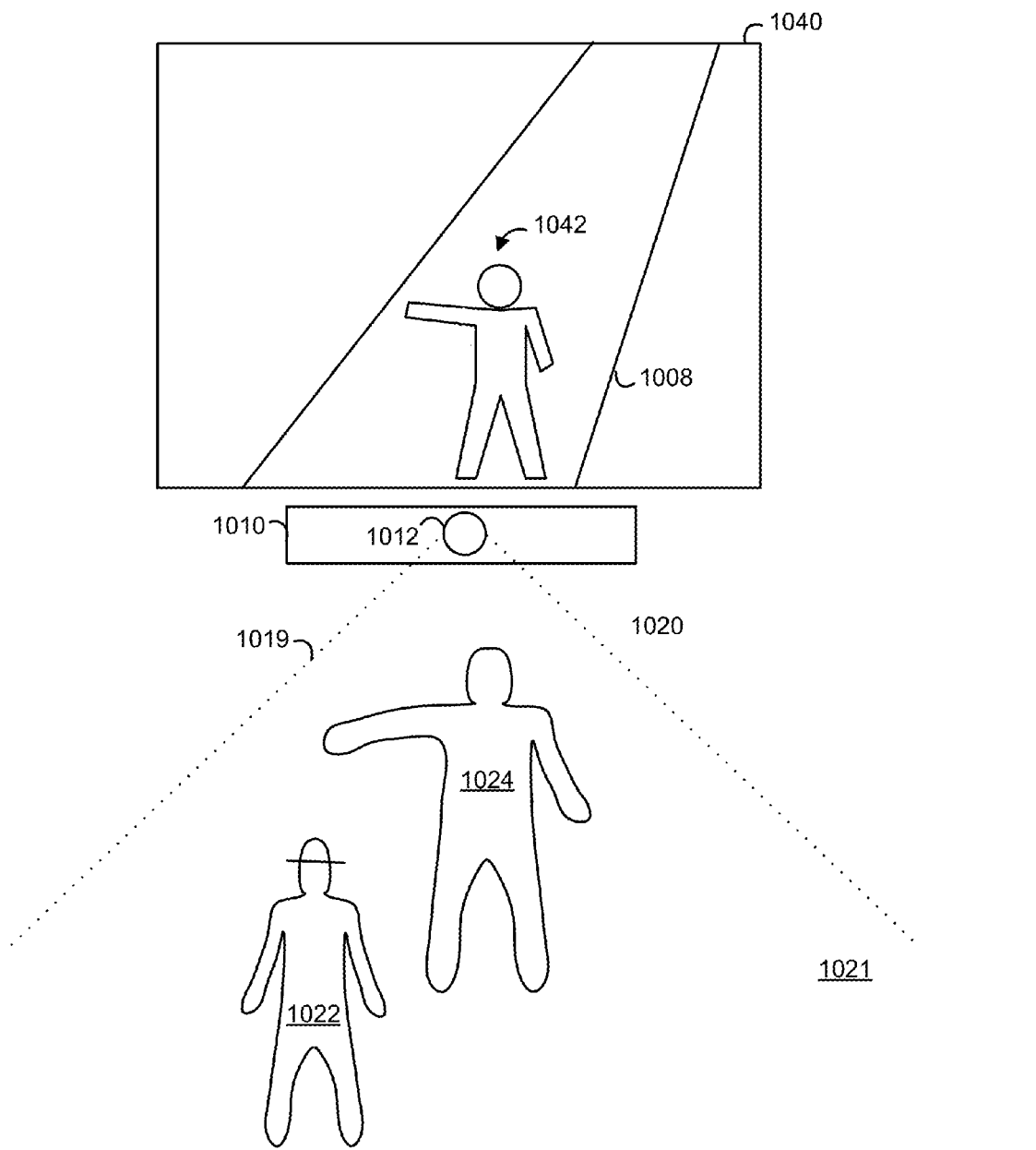
FIG. 10e depicts an example display where a first person is engaged with an application using a profile and avatar.
Figure 10F:
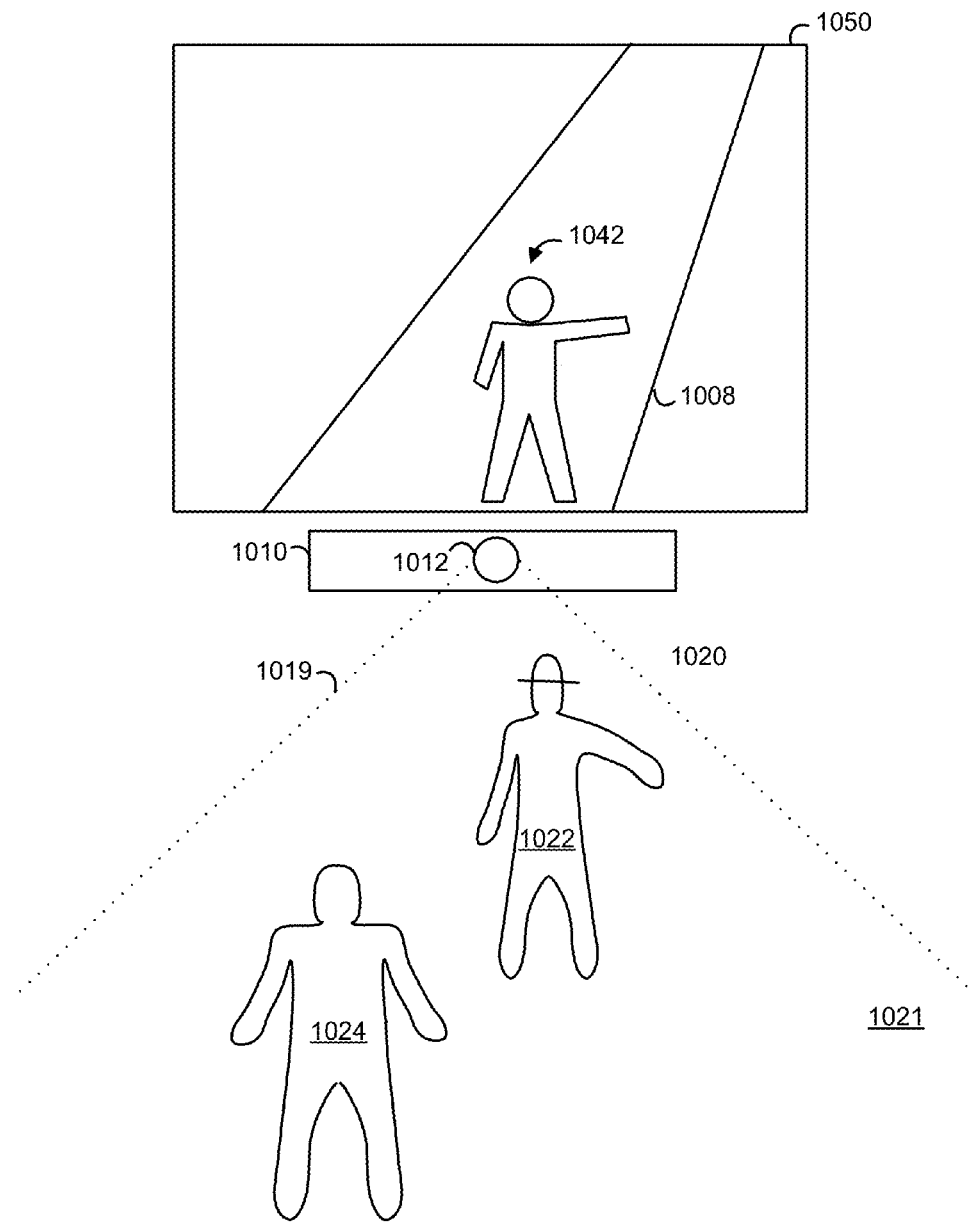
FIG. 10f depicts an example display which follows FIG. 10e when a second person takes the place of the first person in engaging with the application using the profile and avatar.

For example, referring to FIG. 10e, the person 1024 is engaging with the application by controlling an avatar 1042 on the display 1040 (e.g., person 1024 raises left arm and avatar 1042 raises corresponding arm). As an example, the avatar has a generic appearance which does not correspond to the specific shape of the person 1024. A second person 1022 is standing toward the back of the field of view, indicating an intent to not engage. In FIG. 10f, the first person 1024 moves back, indicating an intent to disengage, and the second person 1022 moves forward, indicating an intent to engage, so that movements of the second person are now used to control the avatar 1042 (e.g., person 1022 raises right arm and avatar 1042 raises corresponding arm) in display 1050.

In this example, there is one engaged player at a time, and a player substitution occurs. In another example, there are multiple engaged players at a time, and a player substitution occurs for one or more of the players.

The application itself can also be a factor in determining intent of a person to engage. For example, in a one-player application, a new avatar would not join an existing avatar. For a second person to take the place of a first person, perhaps a stronger, more probable intent to engage by the second person, and a stronger intent to disengage by the first person, might be required. In some cases, the second person may have a strong intent to engage but is ignored as long as the first person does not have an intent to disengage.

FIG. 10a depicts an example where one person is engaged with an application, and other people are not engaged with the application. As discussed previously, people in the field of view do not necessarily intend to engage with the application. Moreover, people outside the field of view may intend to engage with the application. However, this intent can not be determined from image data of the person until the person is in the field of view. Possibly, audio data can be used to determine intent in this case.

The display 1000 provides an example of a virtual word in which an avatar 1025 is standing on a road 1008. The avatar 1025 has a shape which corresponds to that of the person 1024. A depth camera system 1010 having a representative lens 1012 is provided, along with a corresponding field of view 1021, between dashed lines 1019 and 1020. One person 1022 is outside the field of view and is therefore not visually detected by the depth camera system 1010. Another person 1028 is seated in a chair 1030. Another person 1024 is standing facing the depth camera system. Another person 1026 is walking across the field of view. Based on the various considerations discussed previously, the person 1022 would likely not be considered to have an intent to engage with the application based on his or her location outside the field of view, and may not even be recognized as existing. The person 1028 similarly would likely not be considered to have an intent to engage with the application based on his or her location, which is toward the back and side of the field of view 1021, and stance, which is a sitting stance, with the body profile facing the depth camera system.

The person 1024 would likely be considered to have an intent to engage with the application based on his or her location, which is in the center of the field of view 1021, and stance, which is facing the depth camera system with shoulders squared away, and movement, which is raising one arm out to the side. When the person 1024 is engaged, the movements of the avatar 1025 can be set by the application correspondingly to the movements of the person 1024.

The person 1026 would likely not be considered to have an intent to engage with the application based on his or her location, which is toward the side of the field of view 1021, stance, which is the body facing away from the depth camera system, and movement, which is the person moving across the field of view and toward the boundary 1020 of the field of view.

Note that the depth camera system and/or the associated computing environment can repeatedly determine the intent of one or multiple persons, e.g., multiple times per second, so that appropriate changes can be quickly detected and the application adjusted accordingly. Filtering and averaging can be used to smooth the results, e.g., to avoid changes which are too frequent.

FIG. 10b depicts an example display where two people are engaged with an application, and have a common point of view of a virtual space on a display. In display 1002, the person 1024 from FIG. 10a is a joined by the person 1022, who was previously out of the field of view. Based on various factors discussed previously, person 1022 is determined to have an intent to engage with the application. As a result, a corresponding avatar 1023 is provided on the display 1002 alongside the avatar 1025 of the person 1024. In this case, the display provides a common point of view of the virtual space to the people 1022 and 1024, as discussed previously in connection with step 814 of FIG. 8b.

FIG. 10c depicts an example split screen display where two people are engaged with an application, and have different points of view of a virtual space on a display. As discussed previously in connection with step 816 of FIG. 8b, in display 1004, separate display regions 1005 and 1006 are provided for the avatars 1023 and 1025, and the virtual space is viewed from a different viewpoint or camera angle in each display region. For example, the viewpoint of the display region 1006 is about the same as in FIG. 10b. However, the viewpoint of the display region 1005 is quite different than the display region 1002 of FIG. 10b. Note that the avatars 1023 and 1025 are still in the same virtual space. For example, they are both standing on the road 1008. However, the viewpoint of the display region 1005 looks off to the side of the road where there is a house 1007 on a hill, while the viewpoint of the display region 1006 continues to look down the road.

Optionally, the display regions can provide completely different virtual spaces or compartmentalized scenes in the respective display regions. The display regions can even provide virtual spaces of different applications.

As discussed, the relative positions of the display regions 1005 and 1006 can correspond to the relative positions of the people 1022 and 1024. Another option is to provide a display region for a person based on a direction from which the person entered the field of view. For example, person 1022 may enter the field of view from the left hand side, in which case the configuration of FIG. 10c is provided.

FIG. 10d depicts an example split screen display where display regions are swapped when the people swap positions in a physical space, relative to the display regions of FIG. 10c. As discussed previously in connection with FIG. 9c, when the person 1022 moves from the left hand side of person 1024 moves to the right hand side, the display regions 1005 and 1006 are swapped correspondingly. This makes it easier for the people to engage with the application even as they move around in the field of view because they are physically closer to, and aligned with, the display region with which they are interacting.

FIGS. 10a-f provide examples of people's bodies which are tracked in a field of view of a motion capture system, where the tracking includes distinguishing the person's body in the field of view.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. Tangible computer readable memory having computer readable software embodied thereon for programming a processor to perform a method for recognizing an intent of a person to engage with an application in a motion capture system, the method comprising:
   receiving images of a field of view of the motion capture system;
   based on the images, distinguishing a person's body;
   determining a bounding shape of the person's body, the bounding shape is represented by a point within the bounding shape;
   tracking a location of the person's body in the field of view based on the point within the bounding shape relative to a location in the field of view in which an intent to engage with the application is most probable;
   based on the tracking determining a probabilistic measure of an intent by the person to engage with the application;
   based on the probabilistic measure of the intent by the person to engage with the application, determining that the person intends to engage with the application;
   in response to determining that the person intends to engage with the application, allowing the person to engage with the application by automatically associating a profile and an avatar with the person in the application, and displaying the avatar in a virtual space on a display; and
   updating the display by controlling the avatar as the person engages with the application by moving the person's body.

2. The tangible computer readable memory of claim 1, wherein:
   the probabilistic measure of the intent by the person to engage with the application is based on a stance of the person's body in the field of view and how long the stance is maintained.

3. The tangible computer readable memory of claim 1, wherein the method performed further comprises:
   determining movement of the person's body in the field of view relative to an optical axis of a depth camera in the motion capture system, wherein the probabilistic measure of the intent by the person to engage with the application considers that is based on movement of the person's body perpendicular to the optical axis is an indication that the person does not intend to engage with the application.

4. The tangible computer readable memory of claim 1, wherein:
   the probabilistic measure of the intent by the person to engage with the application results in a higher probability of intent to engage when the person is within a specified distance of another person who is engaging with the application.

5. The tangible computer readable memory of claim 1, wherein the method performed further comprises:
   based on the distinguishing, determining a probabilistic measure of an intent by the person to disengage with the application; and
   based on the probabilistic measure of the intent by the person to disengage with the application, determining that the person intends to disengage with the application, in response to which the profile and the avatar are automatically stored indexed to an identifier of the person.

6. The tangible computer readable memory of claim 5, wherein:
   the probabilistic measure of the intent by the person to disengage with the application provides a higher probability of the intent by the person to disengage with the application when the person's body makes a movement which indicates the intent by the person to disengage with the application.

7. The tangible computer readable memory of claim 6, wherein:
the movement which indicates the intent by the person to disengage with the application comprises the person walking away from the display.

8. The tangible computer readable memory of claim 6, wherein:
the movement which indicates the intent by the person to disengage with the application comprises the person turning their back on the display while standing still.

9. The tangible computer readable memory of claim 6, wherein:
the movement which indicates the intent by the person to disengage with the application comprises the person walking away from a location in the field of view in which the intent to engage with the application is most probable.

10. The tangible computer readable memory of claim 6, wherein:
the movement which indicates the intent by the person to disengage with the application comprises the person walking toward a boundary of the field of view and then out of the field of view.

11. The tangible computer readable memory of claim 1, wherein:
the location in the field of view in which an intent to engage with the application is most probable is in a first zone of the field of view; and
a center of the first zone is along an optical axis of a depth camera in the motion capture system.

12. The tangible computer readable memory of claim 1, wherein:
the location in the field of view in which an intent to engage with the application is most probable is in a first zone of the field of view; and
the probabilistic measure is based on a distance between a center of the first zone and the point within the bounding shape.

13. The tangible computer readable memory of claim 1, wherein:
the probabilistic measure is based on one area of multiple areas in the field of view in which the point within the bounding shape is located; and
the multiple areas include a first area which an intent to engage with the application is most probable, a second area in which an intent to engage with the application is moderately probable and a third area in which an intent to engage with the application is less probable than in the second area.

14. The tangible computer readable memory of claim 13, wherein:
the second area surrounds the first area and the third area is outside the second area.

15. A motion capture system, comprising:
a depth camera system to receive images of a field of view;
a display; and
a processor to communicate with the depth camera system and the display, the processor is configured to execute instructions to:
implement an application in the motion capture system,
based on the images, distinguish a person's body and, in response, determine a probabilistic measure of an intent by the person to engage with the application,
based on the probabilistic measure of the intent by the person to engage with the application, determine that the person intends to engage with the application and, in response, an avatar of on the display in an active state, where the avatar moves based on movements of the person and has an appearance consistent with the active state,
determine that the person's body is no longer distinguished in the images;
when a time since the person's body is no longer distinguished in the images is less than a first threshold, allow the avatar to remain in the active state, where the avatar has the appearance consistent with the active state,
when a time since the person's body is no longer distinguished in the images is more than the first threshold, provide the avatar in an inactive state in which the avatar does not move based on movements of the person and in which the avatar has an appearance consistent with the inactive state, and
determine that the person's body is again distinguished in the images and, in response:
(a) if a time in which the avatar is in the inactive state is less than a time out period, provide the avatar again in the active state, where the avatar again moves based on movements of the person and has the appearance consistent with the active state, without determining that the person intends to engage with the application based on a location and a stance of the person in the field of view, and
(b) if a time in which the avatar is in the inactive state is more than the time out period, require a determination that the person intends to engage with the application based on the location and the stance of the person in the field of view as a condition to provide the avatar again in the active state.

16. The motion capture system of claim 15, wherein:
the probabilistic measure of the intent by the person to engage with the application uses a different probability for different zones of the field of view.

17. The motion capture system of claim 15, wherein:
the probabilistic measure of the intent by the person to engage with the application is based on a location and stance of the person's body in the field of view.

18. A processor-implemented method for recognizing an intent of a person to engage with an application in a motion capture system, comprising the processor-implemented steps of:
receiving images of a field of view of the motion capture system;
based on the images, distinguishing a person's body, determining that the person intends to engage with the application and allowing engagement of the person with the application by automatically associating a profile and an avatar with the person in the application, and displaying the avatar in a virtual space on a display;
based on the images, determining that the person's body has not been detected for a first period of time and determining whether the person left the field of view;
in response to the determining that the person's body has not been detected for the first period of time, suspending the engagement of the person with the application;
based on the images, while the engagement of the person with the application is suspended, determining that the person's body is detected again in the field of view;
when the person's body is detected again in the field of view and when the person did not leave the field of view, allowing the person to re-engage with the application without re-determining that the person intends to engage with the application based on a location and a stance of the person in the field of view; and when the person's body is detected again in the field of view and when the person left the field of view: determining how long the engagement of the person with the application has been suspended, and if the engagement of the person with the application has been suspended for more than a specified period of time, re-determining that the person intends to engage with the application based on the location and the stance of the person in the field of view before allowing the person to re-engage with the application.

19. The processor-implemented method of claim 18, wherein:
when the person's body is detected again in the field of view and when the person left the field of view, and if the engagement of the person with the application has not been suspended for more than the specified period of time, allowing the person to re-engage with the application without re-determining that the person intends to engage with the application.

20. The processor-implemented method of claim 18, wherein:
the allowing engagement of the person with the application comprises displaying the avatar in the virtual space on the display and moving the avatar based on movements of the person's body; and
the suspending the engagement of the person with the application comprises not displaying the avatar in the virtual space on the display and not moving the avatar based on movements of the person's body.

* * * * *